(12) United States Patent
Gupta et al.

(10) Patent No.: US 10,515,423 B2
(45) Date of Patent: Dec. 24, 2019

(54) SHAREABILITY SCORE

(71) Applicant: Microsoft Technology Licensing, LLC, Redmond, WA (US)

(72) Inventors: Abhishek Gupta, San Francisco, CA (US); Jui-Ting Huang, Walnut Creek, CA (US); Siegfried Joseph Bilstein, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

(21) Appl. No.: 15/226,697

(22) Filed: Aug. 2, 2016

(65) Prior Publication Data

US 2018/0039631 A1    Feb. 8, 2018

(51) Int. Cl.
*G06Q 50/00*    (2012.01)
*H04L 29/06*    (2006.01)
*H04L 12/58*    (2006.01)

(52) U.S. Cl.
CPC ............ *G06Q 50/01* (2013.01); *H04L 51/32* (2013.01); *H04L 67/42* (2013.01)

(58) Field of Classification Search
CPC .......... G06Q 50/01; H04L 67/42; H04L 51/32
See application file for complete search history.

(56) References Cited

U.S. PATENT DOCUMENTS

| 8,332,512 B1* | 12/2012 | Wu | G06Q 30/0254 705/319 |
| 8,793,154 B2* | 7/2014 | Evans | G06Q 50/01 705/7.11 |
| 8,874,559 B1* | 10/2014 | Karimzadehgan | G06F 16/24568 707/723 |
| 9,177,065 B1* | 11/2015 | Ben-Yair | G06Q 50/01 |
| 9,948,586 B2* | 4/2018 | Braines | H04L 51/10 |
| 2003/0126096 A1* | 7/2003 | Pelletier | G06Q 30/02 705/400 |
| 2005/0026083 A1* | 2/2005 | Ron | B41N 1/14 430/302 |
| 2014/0122584 A1* | 5/2014 | Gargi | G06Q 50/01 709/204 |
| 2014/0297765 A1* | 10/2014 | Beckley | H04L 51/32 709/206 |

(Continued)

*Primary Examiner* — Patrice L Winder
*Assistant Examiner* — Angela M Widhalm De Rodrig
(74) *Attorney, Agent, or Firm* — Schwegman Lundberg & Woessner, P.A.

(57) ABSTRACT

System and methods for generating a shareability score in accordance with some example embodiments are disclosed. A social networking system receives a request to generate a shareability score for a list of content items for an organization. The social networking system identifies a plurality of members associated with the organization and analyzes past share data for the plurality of members to generate an organization sharing profile. The social networking system retrieves early sharing information for each content item in the list of content items. The social networking system generates a shareability score for each particular content item and ranks the list of content items based on the generated shareability scores. The social networking system then transmits the ranked list of content items to a client device, receives a selection of one or more content items, and broadcasts the one or more selected items to a plurality of client devices.

20 Claims, 14 Drawing Sheets

(56) References Cited

U.S. PATENT DOCUMENTS

| | | | | |
|---|---|---|---|---|
| 2015/0039406 A1* | 2/2015 | Dubey | ............... | G06Q 30/0242 |
| | | | | 705/14.4 |
| 2016/0294894 A1* | 10/2016 | Miller | ..................... | H04L 51/32 |
| 2017/0031915 A1* | 2/2017 | Moxon | ............. | G06F 16/24578 |
| 2017/0048184 A1* | 2/2017 | Lewis | ..................... | H04L 51/10 |
| 2017/0262451 A1* | 9/2017 | Milner | ................... | G06Q 50/01 |
| 2017/0359292 A1* | 12/2017 | Aziz | ....................... | H04L 51/32 |

* cited by examiner

SHAREABILITY SCORE

TECHNICAL FIELD

The disclosed example embodiments relate generally to the field of content evaluation and, in particular, to analyzing content use in networks.

BACKGROUND

The rise of the computer age has resulted in increased access to personalized services online. As the cost of electronics and networking services drops, many services can be provided remotely over the Internet. For example, entertainment has increasingly shifted to the online space with companies such as Netflix and Amazon streaming television shows and movies to members at home. Similarly, electronic mail (email) has reduced the need for letters to be physically delivered. Instead, messages are sent over networked systems almost instantly.

Another service that can be provided over computer networks is a social networking service. Such services allow members to connect with other members, share content, update their status, and list important information about themselves. Members can also associate themselves with organizations. Once members have self-selected into groups, data can be analyzed to determine differences in groups of members.

The social networking systems can be used for a variety of purposes. Some social networking systems allow organizations to interact with members who have interest in the organizations. Using the large amount of data stored on the social networking system, the system can provide analytics that help organizations interact more effectively.

DESCRIPTION OF THE DRAWINGS

Some example embodiments are illustrated by way of example and not limitation in the figures of the accompanying drawings.

Like reference numerals refer to corresponding parts throughout the drawings.

DETAILED DESCRIPTION

Figure 1:
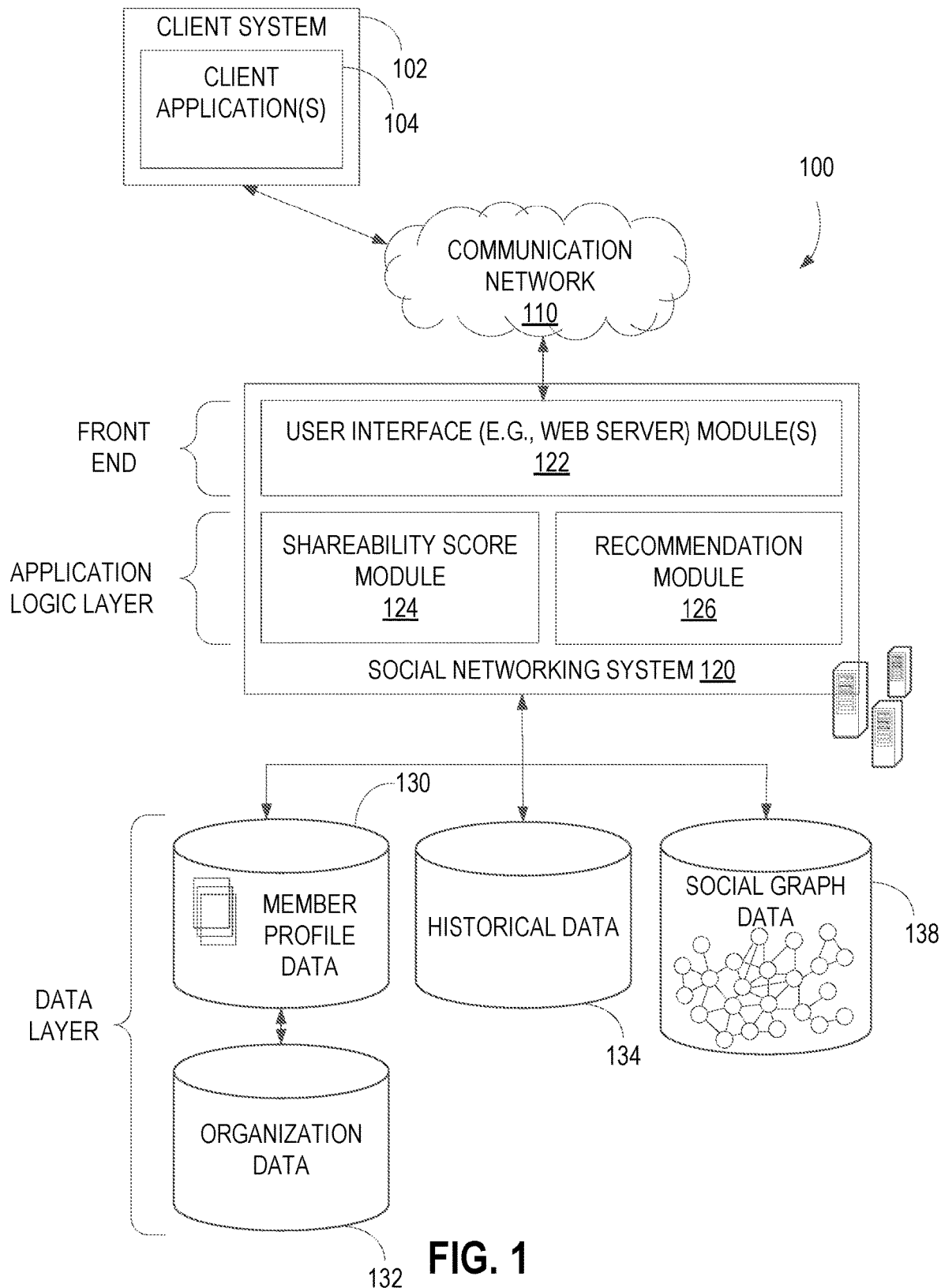
FIG. 1 is a network diagram depicting a client-server system that includes various functional components of a social networking system, in accordance with some example embodiments.

The present disclosure describes methods, systems, and computer program products for determining a shareability score for a plurality of content items. In the following description, for purposes of explanation, numerous specific details are set forth to provide a thorough understanding of the various aspects of different example embodiments. It will be evident, however, to one skilled in the art, that any particular example embodiment may be practiced without all of the specific details and/or with variations, permutations, and combinations of the various features and elements described herein.

In some example embodiments, a social networking system has a plurality of members. In addition, organizations (e.g., companies, non-profits, clubs, and so on) can register with the social networking system to allow members to associate with and to raise awareness of the organization. Organizations can thus use tools provided by a social network to increase their visibility.

In some example embodiments, organizations can recommend content items (e.g., articles, blogs, videos, and so on) to associated members (e.g., employees, owners, volunteers, and so on). These associated members can then share the recommended content items amongst their network. In this way, the organization can assist associated members in raising the associated members' profile and stature, and thus raise awareness and visibility for the organization.

In some example embodiments, an administrator associated with a first organization identifies a plurality of content items and requests the social networking system to provide analysis of each content item to determine how likely the content item is to be shared by members associated with the first organization.

In some example embodiments, in response to the request to analyze each content item to determine how likely the content item is to be shared, the social networking system generates a shareability score for each content item in the plurality of content items.

In some example embodiments, the shareability score is composed of several components, including but not limited to: the history of members of the organization sharing content items from the author or publisher of the content item currently being scored, early activity associated with the content item, the similarity between the content item for which the shareability score is being generated and other content items that have been shared by members of the organizations, the length of the content item or its title, and any other factors that can be measured.

Once shareability scores have been generated, the social networking system ranks the plurality of content items at least in part based on the determined ranks. In some example embodiments, the social networking system transmits the ranked list of content items to the administrator of the organization.

In some example embodiments, the social networking system receives, from the administrator, one or more selected content items. The social networking system then transmits the selected articles to one or more members associated with the first organization.

FIG. 1 is a network diagram depicting a client-server system environment 100 that includes various functional components of a social networking system 120, in accordance with some example embodiments. The client-server system environment 100 includes one or more client systems 102 and the social networking system 120. One or more communication networks 110 interconnect these components. The communication networks 110 may be any of a variety of network types, including local area networks (LANs), wide area networks (WANs), wireless networks, wired networks, the Internet, personal area networks (PANs), or a combination of such networks.

In some example embodiments, the client system 102 is an electronic device, such as a personal computer (PC), a laptop, a smartphone, a tablet, a mobile phone, or any other electronic device capable of communication with the communication network 110. The client system 102 includes one or more client applications 104, which are executed by the client system 102. In some example embodiments, the client application(s) 104 include one or more applications from a set consisting of search applications, communication applications, productivity applications, game applications, word processing applications, or any other useful applications. The client application(s) 104 include a web browser. The client system 102 uses a web browser to send and receive requests to and from the social networking system 120 and to display information received from the social networking system 120.

In some example embodiments, the client system 102 includes an application specifically customized for communication with the social networking system 120 (e.g., a LinkedIn iPhone application). In some example embodiments, the social networking system 120 is a server system that is associated with one or more services.

In some example embodiments, the client system 102 sends a request to the social networking system 120 for a list of content items with associated rankings. For example, an administrator uses the client system 102 to log into the social networking system 120 and request that a particular set of content items be ranked based on a particular criteria. In response, the client system 102 receives the ranked list of content items from the social networking system 120 and displays that ranked list of content items in a user interface on the client system 102.

In some example embodiments, as shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a social networking system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although the social networking system 120 is depicted in FIG. 1 as having a three-tiered architecture, the various example embodiments are by no means limited to this architecture.

As shown in FIG. 1, the front end consists of a user interface module(s) (e.g., a web server) 122, which receives requests from various client systems 102 and communicates appropriate responses to the requesting client systems 102. For example, the user interface module(s) 122 may receive requests in the form of Hypertext Transfer Protocol (HTTP) requests, or other web-based, application programming interface (API) requests. The client system 102 may be executing conventional web browser applications or applications that have been developed for a specific platform to include any of a wide variety of mobile devices and operating systems.

As shown in FIG. 1, the data layer includes several databases, including databases for storing data for various members of the social networking system 120, including member profile data 130, organization data 132, historical data 134, and social graph data 138, which is data stored in a particular type of database that uses graph structures with nodes, edges, and properties to represent and store data. Of course, in various alternative example embodiments, any number of other entities might be included in the social graph (e.g., companies, organizations, schools and universities, religious groups, non-profit organizations, governmental organizations, non-government organizations (NGOs), and any other group) and, as such, various other databases may be used to store data corresponding with other entities.

Consistent with some example embodiments, when a person initially registers to become a member of the social networking system 120, the person will be prompted to provide some personal information, such as his or her name, age (e.g., birth date), gender, contact information, home town, address, educational background (e.g., schools, majors, etc.), current job title, job description, industry, employment history, skills, professional organizations, memberships with other online service systems, and so on. This information is stored, for example, in the member profile data 130.

In some example embodiments, the member profile data 130 includes or is associated with the member interaction data. In other example embodiments, the member interaction data is distinct from, but associated with, the member profile data 130. The member interaction data stores information detailing the various interactions each member has through the social networking system 120. In some example embodiments, interactions include posts, likes, messages, adding or removing social contacts, and adding or removing member content items (e.g., a message or like), while others are general interactions (e.g., posting a status update) and are not related to another particular member. Thus, if a given member interaction is directed towards or includes a specific member, that member is also included in the membership interaction record.

In some example embodiments, the member profile data 130 includes organization data 132. In some example embodiments, organization data 132 includes information about which organizations each respective member is associated with (e.g., employee, owner, volunteer, manager, and so on). In some example embodiments, the organization data 132 also includes information about the organization such as location, business area, size, income, employee list, and so on.

In some example embodiments, the historical data 134 includes all past interactions that members of the social networking system 120 have taken with regard to content items. For example, each time a member shares, likes, comments on, or otherwise interacts with a particular content item, the social networking system 120 stores that interaction in the historical data 134. This information can then later be accessed to determine which content items have been shared or otherwise interacted with.

Once registered, a member may invite other members, or be invited by other members, to connect via the social networking system 120. A "connection" may include a bilateral agreement by the members, such that both members acknowledge the establishment of the connection. Similarly, in some example embodiments, a member may elect to "follow" another member. In contrast to establishing a "connection," the concept of "following" another member typically is a unilateral operation and, at least in some example embodiments, does not include acknowledgement or approval by the member that is being followed. When one member follows another, the member who is following may receive automatic notifications about various interactions undertaken by the member being followed. In addition to following another member, a member may elect to follow a company, a topic, a conversation, or some other entity, which may or may not be included in the social graph. Various other types of relationships may exist between different entities, and are represented in the social graph data 138.

The social networking system 120 may provide a broad range of other applications and services that allow members the opportunity to share and receive information, often customized to the interests of the member. In some example embodiments, the social networking system 120 may include a photo sharing application that allows members to upload and share photos with other members. As such, at least in some example embodiments, a photograph may be a property or entity included within a social graph. In some example embodiments, members of the social networking system 120 may be able to self-organize into groups, or interest groups, organized around a subject matter or topic of interest. In some example embodiments, the data for a group may be stored in a database. When a member joins a group, his or her membership in the group will be reflected in the member profile data 130 and the social graph data 138.

In some example embodiments, the application logic layer includes various application server modules, which, in conjunction with the user interface module(s) 122, generate various user interfaces (e.g., web pages) with data retrieved from various data sources in the data layer. In some example embodiments, individual application server modules are used to implement the functionality associated with various applications, services, and features of the social networking system 120. For instance, a messaging application, such as an email application, an instant messaging application, or some hybrid or variation of the two, may be implemented with one or more application server modules. Similarly, a search engine enabling members to search for and browse member profiles may be implemented with one or more application server modules.

A shareability score module 124 or a recommendation module 126 can also be included in the application logic layer. Of course, other applications or services that utilize the shareability score module 124 and the recommendation module 126 may be separately implemented in their own application server modules.

As illustrated in FIG. 1, in some example embodiments, the shareability score module 124 and the recommendation module 126 are implemented as services that operate in conjunction with various application server modules. For instance, any number of individual application server modules can invoke the functionality of the shareability score module 124 and the recommendation module 126. However, in various alternative example embodiments, the shareability score module 124 and the recommendation module 126 may be implemented as their own application server modules such that they operate as standalone applications.

Generally, the shareability score module 124 seeks to determine, for a plurality of content items (e.g., articles, videos, interactive content), which content items are the most likely to be shared by a particular group of members. For example, if an administrator associated with an organization (e.g., a company) wants to determine which articles, from a list of articles the administrator has access to, will be the most likely to be shared by employees of the organization, the administrator can submit the list of articles to the social networking system (e.g., the system 120 in FIG. 1) and the shareability score module will generate a shareability score for each article.

In some example embodiments, the social networking system 120 determines the respective likelihood for each content item to be shared by generating a score representing the likelihood that members from the targeted group will share the content item. In some example embodiments, the shareability score is made up of one or more factors.

In some example embodiments, the shareability score factors include source factors, content factors, historic sharing data, early sharing data, and so on. In some example embodiments, the social networking system 120 has a database of historical sharing information. The social networking system 120 can then use computer learning techniques to train a predictive model to generate shareability scores.

In some example embodiments, each factor has one or more components that are used to calculate the factor. In some example embodiments, the source factors include determining past sharing information for the author of the content item. Similarly, the source factors include identifying the past sharing information for the publisher or source of the content item. In some example embodiments, the source factor includes determining the number of social networking system connections that the author of the content item has.

In some example embodiments, the content factors include calculating, based on past sharing information for the group of members, one or more keywords. In some example embodiments, the keywords are determined based on the words common in highly shared articles. For example, the social networking system (e.g., the server 120 in FIG. 1) parses the text of all past articles. Parsing each article produces a list of words associated with each article. Based on information detailing whether the article was shared, the social networking system (e.g., the server 120 in FIG. 1) can calculate the percentage of articles that include that word and are subsequently shared. Words that have a high sharing percentage can be determined to be keywords.

In some example embodiments, the social networking system (e.g., the server 120 in FIG. 1) can group words into phrases that contain two, three, or more words and conduct a similar analysis on those phrases. In some example embodiments, a more complex approach, like training a Bayesian classifier using existing data can used to identify key words or phrases.

In other example embodiments, the keywords are determined by analyzing the organization that the targeted members are associated with (e.g., a company) and determining an area of business or expertise for that organization. Once the area of business or expertise is determined, a list of keywords associated with that content area is retrieved. For example, the social networking system (e.g., the server 120 in FIG. 1) accesses or maintains a pre-determined table that matches keywords to business areas. In some example embodiments, an organization's business area is stored in the organization's profile. In other example embodiments, the social networking system (e.g., the server 120 in FIG. 1) uses a third party list to determine an organizations area of business.

The content factor is then determined for each content item based on the number of keywords present in each content item. In some example embodiments, the value of the content factor scales linearly with the number of keywords. In other example embodiments, the social networking system 120 determines whether each keyword is mentioned at least once and generates a sub-score that represents the percentage of keywords that is mentioned at least once.

In some example embodiments, the historic sharing factor measures the sharing habits of the members in the targeted group. For example, the social networking system 120 analyzes the historic sharing patterns for members in the target.

In some example embodiments, the early sharing content factor includes determining how much the content item is being shared in the early sharing period. In some example embodiments, the early sharing period is the first four hours from when the content item is published or made available. In some example embodiments, the shareability score module 124 determines the number of shares that occur in the first four hours of the content item being released.

In some example embodiments, the shareability score module 124 also measures the influence level of the sharing members when determining the early sharing factor. For example, if two articles are shared four times in the first four hours of being released, but the first article is shared by members with high influence levels and the second article is shared by members with relatively low influence levels, the shareability score module 124 will rank the first article as having a higher early sharing factor score than the second article.

In other example embodiments, the shareability score module 124 calculates an early sharing speed score. In some example embodiments, the shareability score module 124 determines the number of shares at 4 hours and again at 8 hours. In some example embodiments, the difference between these two times is used as a speed of sharing calculation. In some example embodiments, different time frames can be used.

In some example embodiments, the shareability score module 124 creates the shareability score by combining the determined factors. In some example embodiments, each factor has a predetermined associated weight and the influence of each factor on the shareability score is determined by the weight assigned to the factor.

In some example embodiments, the score is a value between 0 (the lowest possible shareability score) and 1 (the highest possible). In other example embodiments, the shareability score is represented as a binary representation that indicates whether the content item exceeds a minimum amount of shareability in the designated group of members. For example, the predetermined threshold is 0.5. Any content item exceeding that score is determined to be shareable and any content item below that threshold is determined to be non-shareable.

In some example embodiments, the recommendation module 126 then uses the shareability scores determined by the shareability score module 124 to create one or more recommendations or rankings for a plurality of content items. In some example embodiments, the social networking system 120 identifies, for a given organization or group of members, a plurality of new content items that are related to the organization or group of members. In other example embodiments, an administrator associated with the target organization or group of members selects a list of content items (or a source of content items, like an RSS feed) to be ranked by the shareability score module 124.

Once the recommendation module 126 receives a shareability score for each content item in the list of evaluated content items, the recommendation module 126 ranks the list of content item based at least in part on the shareability scores. The ranked list is then transmitted to the administrator of the organization (or any member seeking to share content items with a specified group of members). The administrator can choose one or more content items to broadcast to all members associated with the administrator's organization or other designated group of members.

In some example embodiments, the list of content items are a list of content item pitch ideas, and the rankings reflect which of the pitch ideas are most likely to be shared by the target audience. In response, the administrator can choose which pitch ideas to authorize into full content items.

Figure 2:
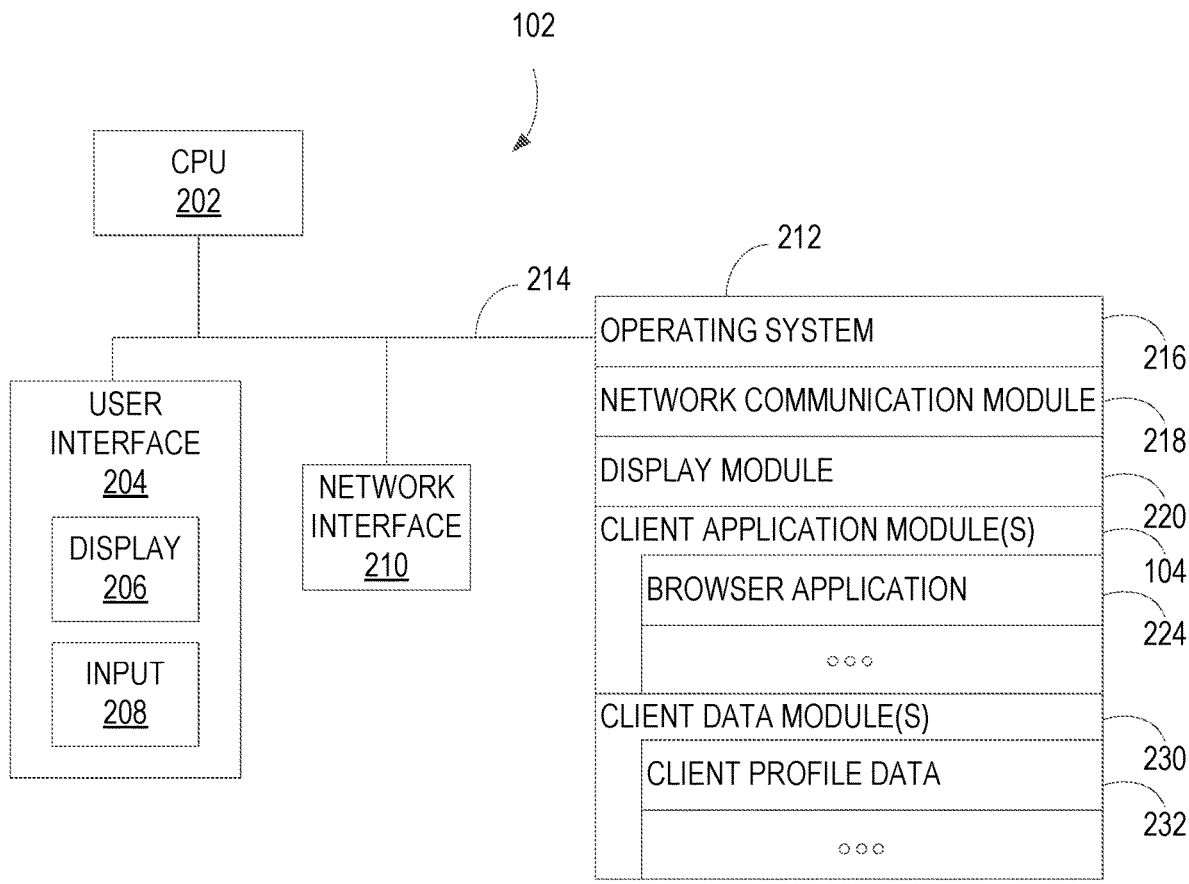
FIG. 2 is a block diagram illustrating a client system, in accordance with some example embodiments.

FIG. 2 is a block diagram further illustrating the client system 102, in accordance with some example embodiments. The client system 102 typically includes one or more central processing units (CPUs) 202, one or more network interfaces 210, memory 212, and one or more communication buses 214 for interconnecting these components. The client system 102 includes a user interface 204. The user interface 204 includes a display device 206 and optionally includes an input means 208 such as a keyboard, a mouse, a touch sensitive display, or other input buttons. Furthermore, some client systems 102 use a microphone and voice recognition to supplement or replace the keyboard.

The memory 212 includes high-speed random-access memory, such as dynamic random-access memory (DRAM), static random-access memory (SRAM), double data rate random-access memory (DDR RAM), or other random-access solid state memory devices; and may include non-volatile memory, such as one or more magnetic disk storage devices, optical disk storage devices, flash memory devices, or other non-volatile solid state storage devices. The memory 212 may optionally include one or more storage devices remotely located from the CPU(s) 202. The memory 212, or alternatively, the non-volatile memory device(s) within the memory 212, comprise(s) a non-transitory computer-readable storage medium.

In some example embodiments, the memory 212, or the computer-readable storage medium of the memory 212, stores the following programs, modules, and data structures, or a subset thereof:

- an operating system 216 that includes procedures for handling various basic system services and for performing hardware-dependent tasks;
- a network communication module 218 that is used for connecting the client system 102 to other computers via the one or more network interfaces 210 (wired or wireless) and one or more communication networks 110, such as the Internet, other WANs, LANs, metropolitan area networks (MANs), etc.;

a display module 220 for enabling the information generated by the operating system 216 and client application(s) 104 to be presented visually on the display device 206;

one or more client applications 104 for handling various aspects of interacting with the social networking system (e.g., system 120 in FIG. 1), including but not limited to:

a browser application 224 for requesting information from the social networking system 120 (e.g., article lists) and receiving responses from the social networking system 120; and client data module(s) 230 for storing data relevant to clients, including but not limited to:

client profile data 232 for storing profile data related to a member of the social networking system 120 associated with the client system 102.

Figure 3:
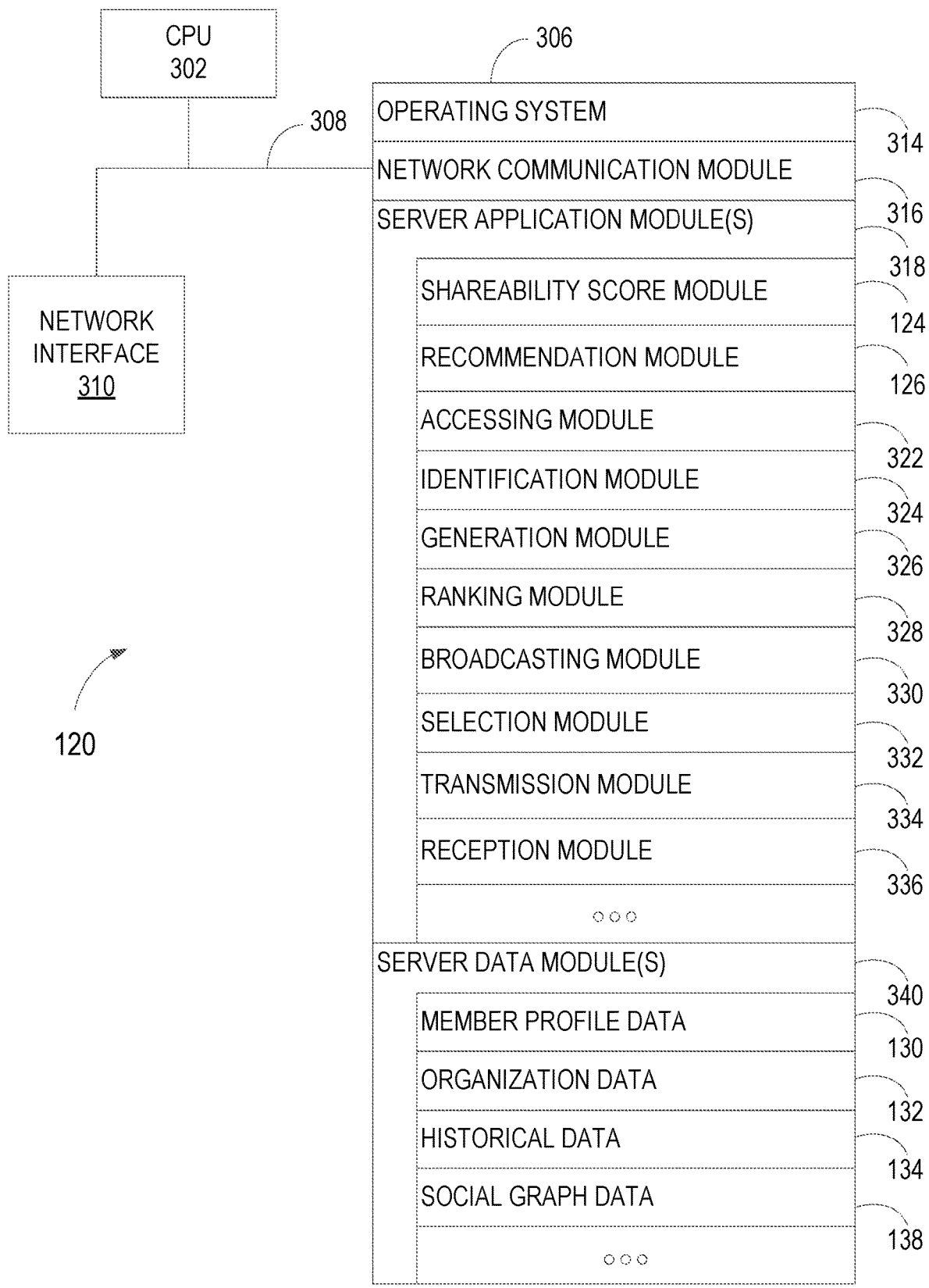
FIG. 3 is a block diagram illustrating a social networking system, in accordance with some example embodiments.

FIG. 3 is a block diagram further illustrating the social networking system 120, in accordance with some example embodiments. Thus, FIG. 3 is an example embodiment of the social networking system 120 in FIG. 1. The social networking system 120 typically includes one or more CPUs 302, one or more network interfaces 310, memory 306, and one or more communication buses 308 for interconnecting these components. The memory 306 includes high-speed random-access memory, such as DRAM, SRAM, DDR RAM, or other random-access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302.

The memory 306, or alternatively the non-volatile memory device(s) within the memory 306, comprises a non-transitory computer-readable storage medium. In some example embodiments, the memory 306, or the computer-readable storage medium of the memory 306, stores the following programs, modules, and data structures, or a subset thereof:

an operating system 314 that includes procedures for handling various basic system services and for performing hardware-dependent tasks;

a network communication module 316 that is used for connecting the social networking system 120 to other computers via the one or more network interfaces 310 (wired or wireless) and one or more communication networks 110, such as the Internet, other WANs, LANs, MANs, and so on;

one or more server application modules 318 for performing the services offered by the social networking system 120, including but not limited to:

a shareability score module 124 for generating a shareability score for a plurality of content items for a particular group of members (e.g., all the members associated with a particular organization) by using a variety of factors to estimate the likelihood that members in the particular group with re-share the content item;

a recommendation module 126 for ranking a designated group of content items based on their generated shareability scores to recommend content items to an administrator for a group of members;

an accessing module 322 for accessing historical data 134 describing member interactions with the content items in the past (e.g., members sharing articles and so on);

an identification module 324 for identifying a particular group of members associated with a designated organization or group;

a generation module 326 for generating a shareability score from a plurality of sub-factors, including, but not limited to early sharing factors, historical factors, and content factors;

a ranking module 328 for ranking a series of content items based, at least in part, on the determined shareability scores associated with each content item;

a broadcasting module 330 for transmitting selected content items to a plurality of members associated with a particular member group (e.g., an organization);

a selection module 332 for selecting one or more content items for consideration for a particular organization based on information about the organization stored in the organization data 132;

a transmission module 334 for transmitting a content item ranking module to an administrator associated with a particular organization for selection by the administrator; and a reception module 336 for receiving a selection of content items from an administrator based on transmitted rankings sent to the administrator; and server data module(s) 340, holding data related to the social networking system 120, including but not limited to:

member profile data 130, including both data provided by the member, who will be prompted to provide some personal information, such as his or her name, age (e.g., birth date), gender, interests, contact information, home town, address, educational background (e.g., schools, majors, etc.), current job title, job description, industry, employment history, skills, professional organizations, memberships to other social networks, customers, past business relationships, and seller preferences; and inferred member information based on the member's activity, social graph data 138, overall trend data for the social networking system 120, and so on;

organization data 132 including data describing each organization associated with the social networking system 120 and the list of members associated with each organization or group;

historical data 134 including data describing each instance of a member sharing a content item through the social networking system 120 in the past, and for each content item shared through the social networking system 120, the number of times in total it was shared and the list of members who shared it; and social graph data 138 including data that represents members of the social networking system 120 and the social connections between them.

Figure 4:
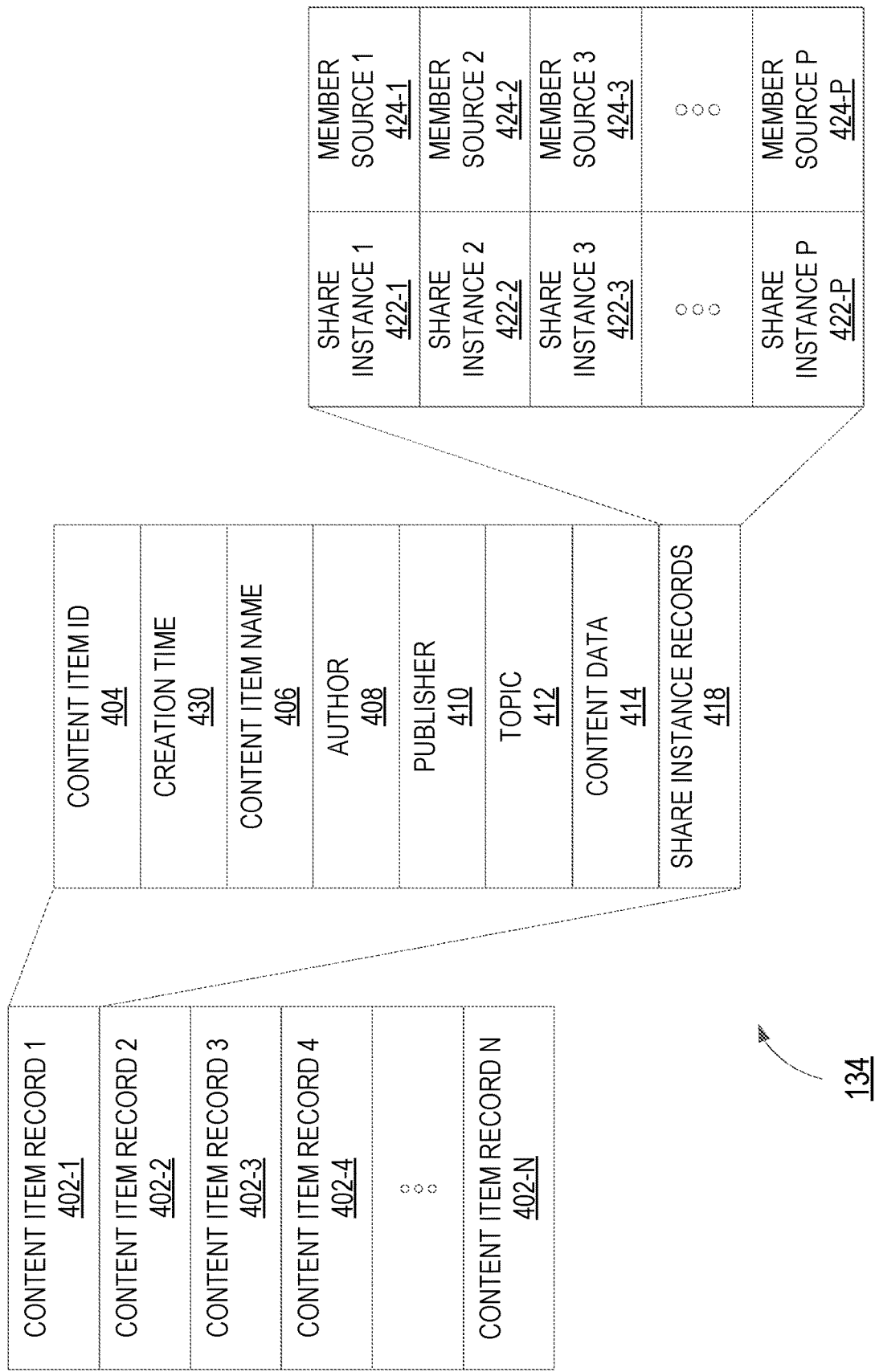
FIG. 4 is a block diagram of an exemplary data structure for the historical data database introduced in FIG. 1, in accordance with some example embodiments.

FIG. 4 is a block diagram of an exemplary data structure for the historical data 134 database. In some example embodiments, the historical data 134 includes a plurality of content item records (402-1 to 402-N). It should be noted that when a generic content item record is being discussed herein, the reference number 402 will be used, rather than refer to a specific numbered content item record. Each content item record represents a content item and the interactions that have been taken with respect to each record.

In some example embodiments, a respective content item record 402 stores a unique content item ID 404 for the content item record 402, a creation time 430 for the content item, a content item name 406 for the content item (e.g., the video, article, interactive game, and so on), author 408, publisher 410, one or more topics 412, content data 414 (e.g., the data that contains all the content of the content item including the text of an article, the data that encodes the video, the parameters of the interactive media, and so on), and one or more share instance records 418.

In some example embodiments, the share instance records 418 include a list of share instances 422-1 to 422-P (each instance wherein a member shares that content item associated with the content item record 402) and records of the member who shared the content item. Each instance 422-1 to 422-P describes one instance of a member sharing the content item once through a social media outlet. For example, a member could post a link to the content in a communication channel such as their social network feed, in a blog, in a tweet, and so on. Similarly, the member can send a specific person the content item (or link to the content item) through an email or text. Each share instance 422-1 to 422-P is recorded and stored in the historical data 134 at the social networking system 120.

The member source 424-1 to 424-P associated with each share instance 422-1 to 422-P records which member shared the content item. In some example embodiments, it also includes the time of the share, the amount of engagement the share received from other members (e.g., likes, comments, up votes, and so on). In some example embodiments, a member's influence level is stored with the member source 424-1 to 424-P data.

Figure 5A:
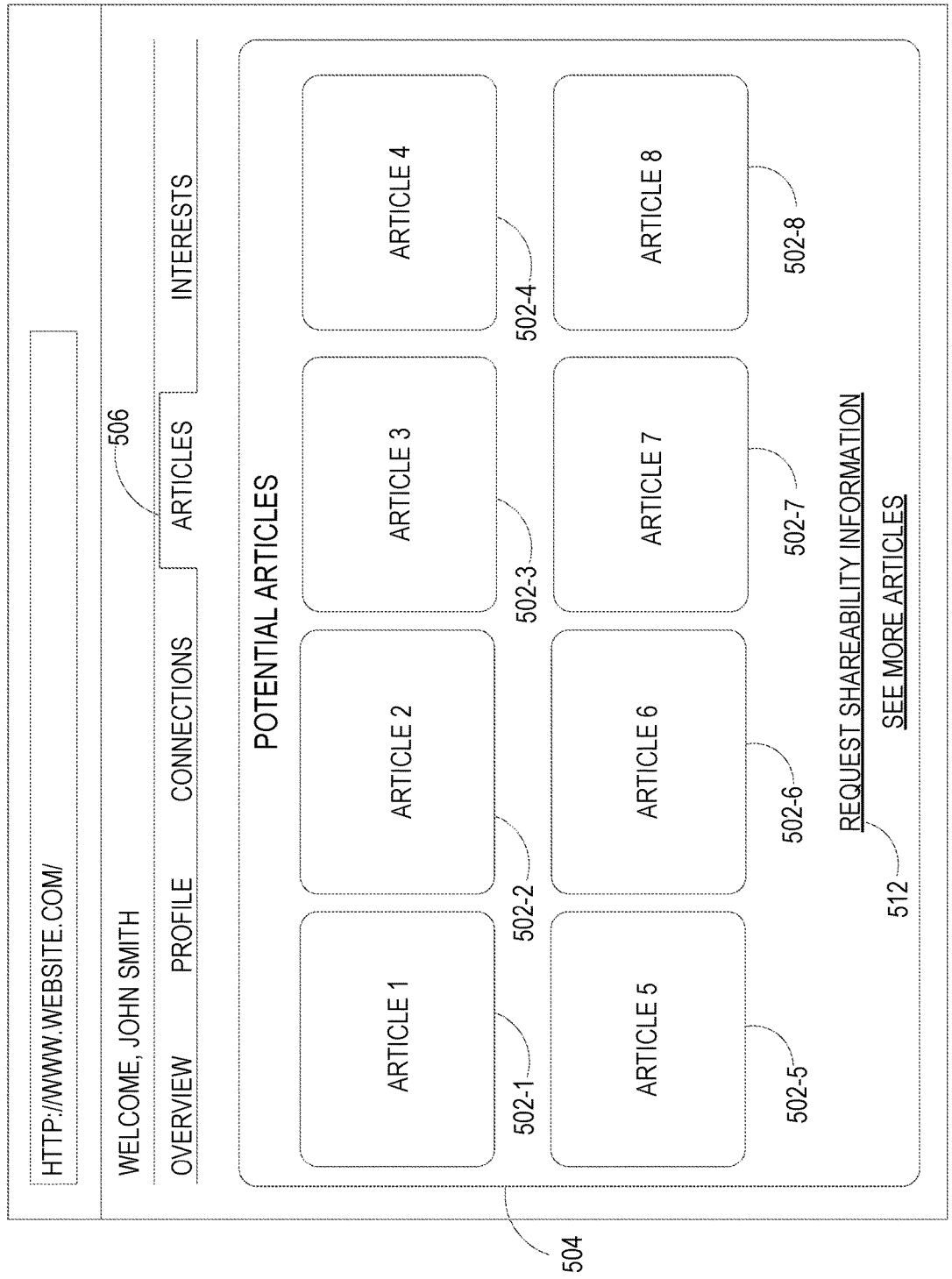
FIGS. 5A-5B are user interface diagrams illustrating an example of a user interface or web page that incorporates a list of content items (e.g., articles) for selection by an administrator through the social networking system, in accordance with some example embodiments.

FIG. 5A is a user interface diagram illustrating an example of a user interface 500 or web page that incorporates a list of content items (e.g., articles) for selection by an administrator through the social networking system (e.g., the social networking system 120 in FIG. 1). In the example user interface 500 of FIG. 5A, the displayed user interface 500 represents a web page for a member (or administrator) of the social networking system (e.g., the social networking system 120 in FIG. 1) with the name John Smith.

As can be seen, an articles tab 506 has been selected and a page of potential articles 504 is displayed. The potential articles 504 include a plurality of articles 502-1 to 502-8, wherein each article displays a title and a description. In some example embodiments, the administrator can select one or more articles 502-1 to 502-8 for distribution to members associated with a particular group or organization (e.g., a company that the administrator is employed by).

In some example embodiments, the user interface 500 also includes an option to provide shareability information. Shareability information includes any information that may be useful in determining whether an article is likely to be shared or not. Once the member (e.g., administrator) requests shareability information, the social networking system (e.g., the social networking system 120 in FIG. 1) computes shareability scores for each of the articles 502-1 to 502-8. The social networking system (e.g., the social networking system 120 in FIG. 1) then re-ranks the articles 502-1 to 502-8 based, at least in part, on the associated shareability score.

Figure 5B:
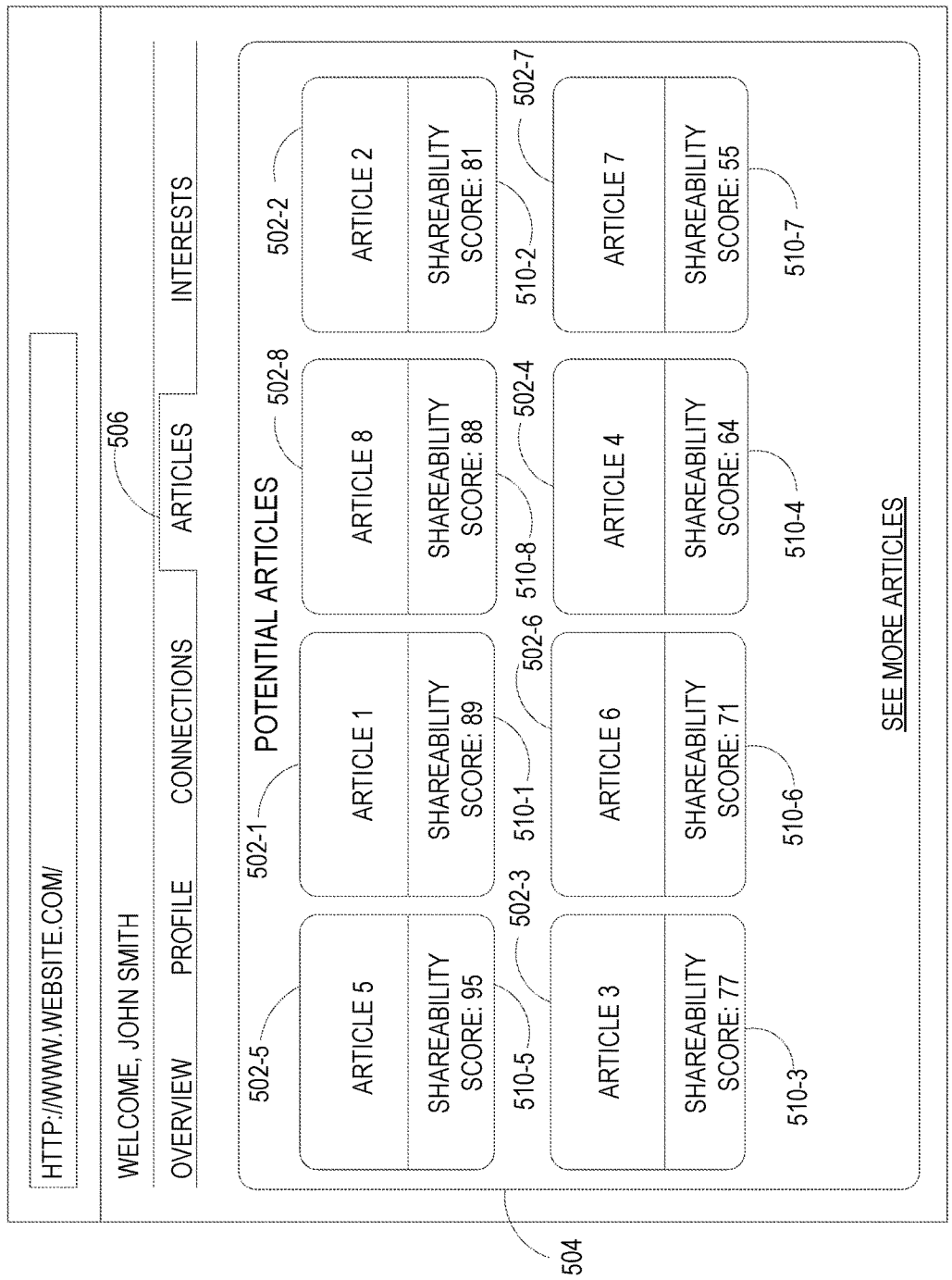

FIG. 5B is a user interface diagram further illustrating an example of the user interface 500 or web page that incorporates a list of content items (e.g., articles) for selection by an administrator through the social networking system (e.g., the social networking system 120 in FIG. 1). The example user interface 500 of FIG. 5B represents a continuation from FIG. 5A, in response to a member selecting the Request Shareability information 512 link.

In response, the social networking system (e.g., the social networking system 120 in FIG. 1) determines a shareability score 510-1 to 510-8 for each article 502-1 to 502-8. In this example, that shareability score is then displayed along with the associated article. In other example embodiments, the shareability score is not actually displayed but is used to reorder the articles on the page.

Figure 6:
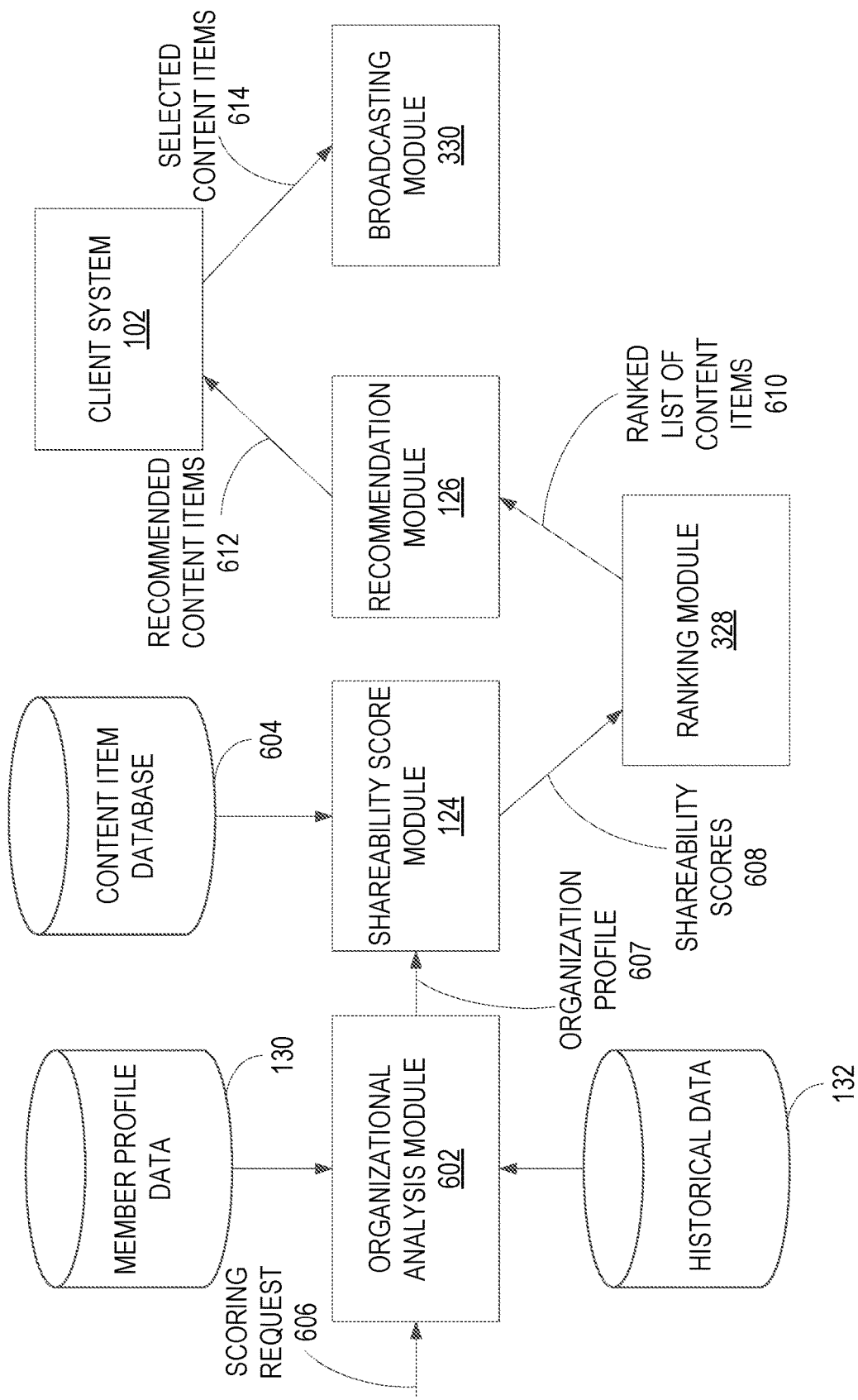
FIG. 6 is a flow diagram illustrating a method, in accordance with some example embodiments, for evaluating content items based on how likely they are to be shared within a particular group of members.

FIG. 6 is a flow diagram illustrating a method, in accordance with some example embodiments, for evaluating content items based on how likely they are to be shared within a particular group of members. Each of the operations shown in FIG. 6 may correspond to instructions stored in a computer memory or computer-readable storage medium. In some embodiments, the method described in FIG. 6 is performed by a social networking system (e.g., the social networking system 120 in FIG. 1). However, the method described can also be performed by any other suitable configuration of electronic hardware.

In some embodiments, the method is performed by a social networking system (e.g., the social networking system 120 in FIG. 1) including one or more processors and memory storing one or more programs for execution by the one or more processors.

In some example embodiments, the social networking system (e.g., the social networking system 120 in FIG. 1) receives a scoring request 606 from an administrator associated with an organization. In some example embodiments, the administrator has been authorized to distribute content items to members associated with the organization. In some example embodiments, when an organization is registered with the social networking system (e.g., the social networking system 120 in FIG. 1), members authorized to make decisions for the organization are established.

In some example embodiments, the organizational analysis module 602 then uses the member profile data 130 (including information about membership in organizations) to identify a plurality of members associated with the organization (e.g., employees, volunteers, owners, and so on). The organizational analysis module 602 then accesses historical data 132 for the members associated with the organization to create an organization profile 607. The organization profile 607 enables the shareability score module 124 to generate shareability scores that are customized to the habits and trends of a particular organization. In some example embodiments, the organization profile 607 is a model or a component of a model that is created using computer learning techniques (e.g., neural networks and so on) and is used during the process of generating shareability scores to ensure that the shareability score is based on the specific characteristics of an particular organization based on the characteristics of content items.

In some example embodiments, the organization profile 607 is transmitted to the shareability score module 124. The shareability score module 124 uses the received organization profile 607 as part of the process of evaluating a list of content items by creating a shareability score. A shareability score is a numerical representation of the likelihood that a member associated with a particular organization will share the content item. In some example embodiments, the shareability score is a value between 0 and 1. In other example embodiments, other numerical representations can be used.

In some example embodiments, the shareability score module 124 creates a shareability score 608 by feeding data input about the content item into a scoring model. For example, the social networking system (e.g., the server 120 in FIG. 1) uses computer learning to create a scoring model based on past sharing data. In some example embodiments, the model is created using a deep learning or neural network learning method. This scoring model uses the text of an article, metadata of the article, and organization profile data about the organization to as input to the scoring model.

In some example embodiments, the model uses the entire corpus of past articles and sharing information to identify relationships between articles and the likelihood that member from a particular organization will share that article. In some example embodiments, the relationships can be based on frequency terms (e.g., with a large enough body of articles, determining which terms occur in the shared articles enable a model to effectively estimate likelihood of sharing). In some example embodiments, the important of terms is weighted by an inverse frequency score.

In other example embodiments, a model is trained by determining correlations using a neural network. In this example, the neural network takes inputs (e.g., the includes the author of the content item, the publisher of the content item, early sharing information about the content item (e.g., how many members associated with the organization have shared it in the first four hours, how influential are those members, how many social connections, how many have shared it by the eight hour mark, and so on), metadata of the article, organization profile data about the organization, and so on). Each of these inputs is given a weight and passed to a plurality of hidden nodes. The hidden nodes exchange information, also given weights, to produce an output. In some example embodiments, there are several layers of hidden nodes. The output in this case is value between 0 and 1.

In some example embodiments, the model is trained using existing data (e.g., search queries matched to successful purchases) and the neural network learning algorithm adaptively adjusts the weights to product semantic meaning vectors for queries and item records that match existing records. In some example embodiments, when new transactions occur, the model is updated with the new data. The scoring model then processes the data to produce the shareability score 608.

In some example embodiments, the shareability score module 124 generates a plurality of sub-scores (e.g., content scores, historical trends, early sharing score) and then determines weights for the sub-scores based on the organizational profile 607. For example, if during the creation of a particular organization profile the social networking system (e.g., the server 120 in FIG. 1) determines that the publisher of the article is the most important factor in determining whether the article will be shared, the organization profile will weigh the publisher sub-score more heavily than other sub-scores. In another organization, the amount of early sharing has a bigger impact and receives greater weight.

In some example embodiments, the sub-scores are combined together based on the weights to create the shareability score 608. In some example embodiments, this is accomplished by a generation module (e.g., module 326 in FIG. 3). For example, if sub-score 1 ($S_1$) and sub-score 2 ($S_2$) had respective weights weight 1 ($W_1$) and weight 2 ($W_2$), the shareability score could be determined as follows:

$$Score = S_1 * W_1 + S_2 * W_2$$

In some example embodiments, the shareability scores 608 are sent to the ranking module 328. In some example embodiments, the ranking module 328 generates ranks for the list of content items based at least partially on the shareability scores 608 of the content items. In some example embodiments, the ranked list of content items 610 is then sent to the recommendation module 126. In some example embodiments, the recommendation module 126 selects one or more content items to transmit to the client system 102 of the administrator of the organization. In some example embodiments, the recommended content items 612 are selected based on their rankings and transmitted to the client system (e.g., the client system 102 in FIG. 1) for display.

In some example embodiments, the social networking system (e.g., the social networking system 120 in FIG. 1) receives one or more selected content items 614 from the client system (e.g., the client system 102 in FIG. 1) based on the indications of the administrator (e.g., the administrator clicks on (or otherwise indicates) approved content items and the client system (e.g., the client system 102 in FIG. 1) transmits that data to the social networking system (e.g., the social networking system 120 in FIG. 1). The broadcasting module 330 then sends the selected content items 614 to the plurality of members associated with the organization (e.g., through email or other communication means).

Figure 7:
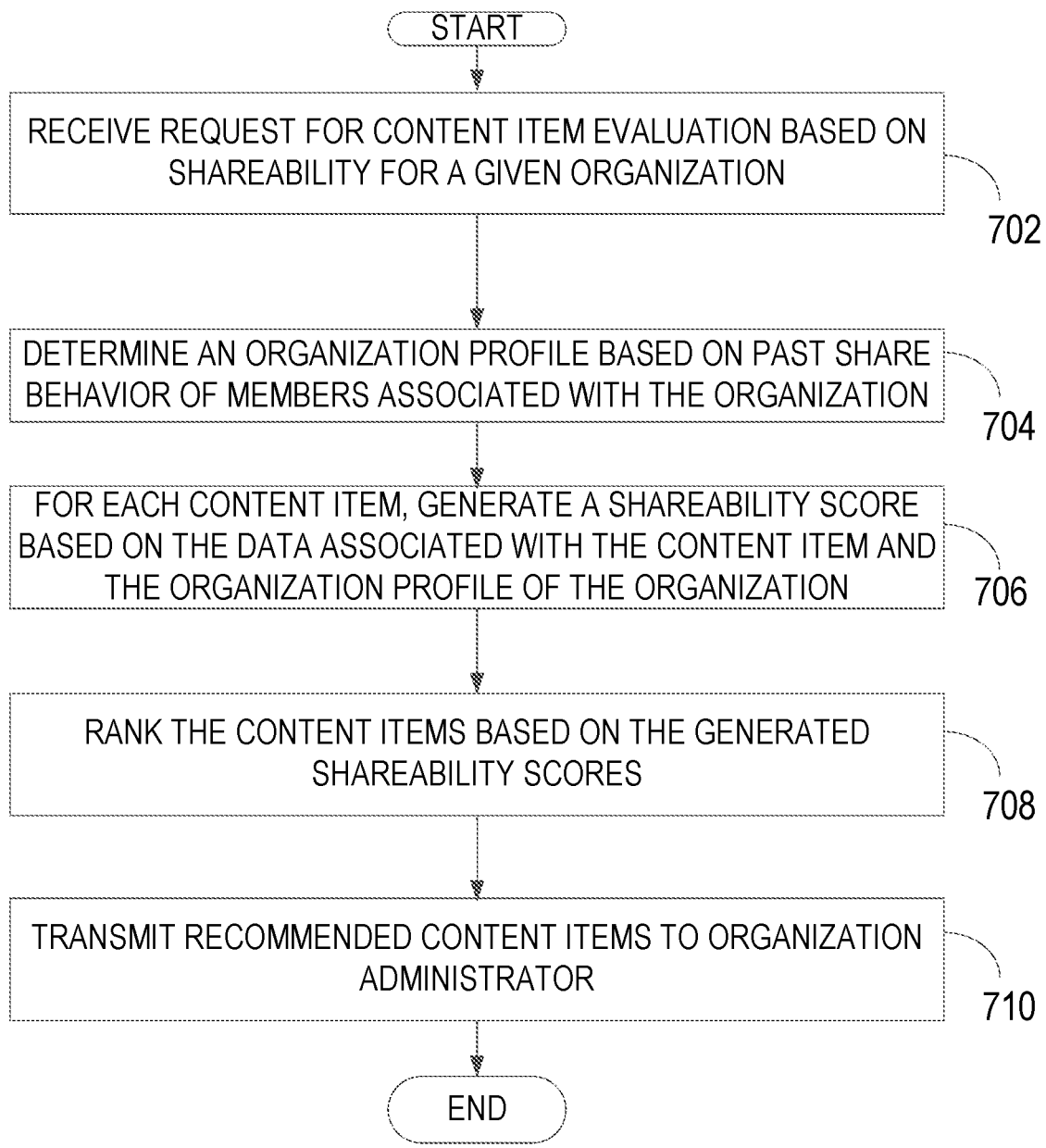
FIG. 7 is a flow diagram illustrating a method, in accordance with some example embodiments, for evaluating content items based on how likely the content items are to be shared by a particular group of members of a social networking system.

FIG. 7 is a flow diagram illustrating a method, in accordance with some example embodiments, for evaluating content items based on how likely the content items are to be shared by a particular group of members of a social networking system (e.g., the social networking system 120 in FIG. 1). Each of the operations shown in FIG. 7 may correspond to instructions stored in a computer memory or computer-readable storage medium. In some embodiments, the method described in FIG. 7 is performed by the social networking system (e.g., the social networking system 120 in FIG. 1). However, the method described can also be performed by any other suitable configuration of electronic hardware.

In some embodiments the method is performed by a social networking system (e.g., the social networking system 120 in FIG. 1) including one or more processors and memory storing one or more programs for execution by the one or more processors.

In some example embodiments, the social networking system (e.g., the social networking system 120 in FIG. 1) receives (Operation 702) a request for content item evaluation based on the shareability of the content items by a particular group of members of the social networking system (e.g., the social networking system 120 in FIG. 1). In some example embodiments, the group of members is determined by identifying a particular organization (e.g., company, group, non-profit, association, and so on) and then identifying all the members who are associated with that organization. In some example embodiments, the request originates from an administrator associated with a particular organization.

In some example embodiments, the social networking system (e.g., the social networking system 120 in FIG. 1) determines (Operation 704) an organization profile for a specific organization based on the past share behavior of members associated with the organization. In some example embodiments, an organization profile is a model that assigns weights and values to data from content items. In other example embodiments, the organization profile is used as input to a classifier or model that allows the model or classifier to accurately score content items for a particular set of members (e.g., organization) rather than for the set of all members of the social networking system (e.g., the social networking system 120 in FIG. 1).

For each content item, the social networking system (e.g., the social networking system 120 in FIG. 1) generates (Operation 706) a shareability score based on the data associated with the content item and the organization profile of the organization. In some example embodiments, the shareability score is a value between 0 and 1 and is generated by a model or classifier that takes information about the content item as input and issues a shareability score as output. In some example embodiments, the model is trained using historical data that describes which content items were shared by the members associated with the organization.

In some example embodiments, the social networking system (e.g., the social networking system 120 in FIG. 1) ranks (Operation 708) the list of content items based on the generated shareability scores. In some example embodiments, the social networking system (e.g., the social networking system 120 in FIG. 1) selects one or more content items based on the rankings. In some example embodiments, the social networking system (e.g., the social networking system 120 in FIG. 1) transmits (Operation 710) the one or more selected content items to the client system (e.g., the client system 102 in FIG. 1) associated with the administrator for display. In some example embodiments, the administrator can select one or more of the selected content items.

Figure 8A:
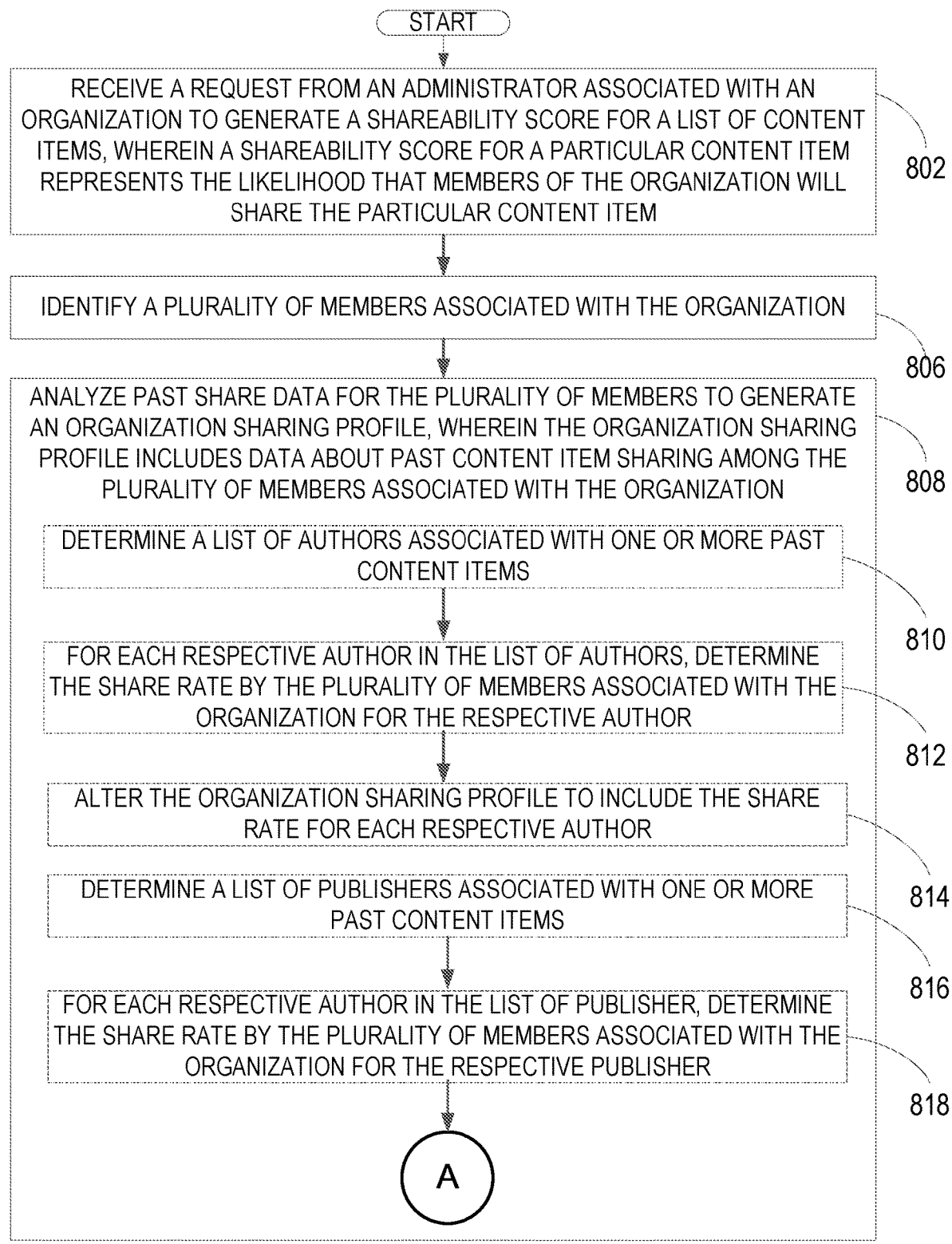
FIGS. 8A-8D are flow diagrams illustrating a method, in accordance with some example embodiments, for evaluating content items based on how likely the content items are to be shared by a particular group of members of a social networking system.

FIG. 8A is a flow diagram illustrating a method, in accordance with some example embodiments, for evaluating content items based on how likely the content items are to be shared by a particular group of members of a social networking system (e.g., the social networking system 120 in FIG. 1). Each of the operations shown in FIG. 8A may correspond to instructions stored in a computer memory or computer-readable storage medium. Optional operations are indicated by dashed lines (e.g., boxes with dashed-line borders). In some embodiments, the method described in FIG. 8A is performed by the social networking system (e.g., the social networking system 120 in FIG. 1). However, the method described can also be performed by any other suitable configuration of electronic hardware.

In some embodiments the method is performed by a social networking system (e.g., the social networking system 120 in FIG. 1) including one or more processors and memory storing one or more programs for execution by the one or more processors.

In some example embodiments, the social networking system (e.g., the social networking system 120 in FIG. 1) receives (Operation 802) a request from an administrator associated with an organization to generate a shareability score for a list of content items. In some example embodiments, the request is generated by the administrator interacting via an interface with the social networking system (e.g., the social networking system 120 in FIG. 1) (e.g., a website) displayed on the administrator's client device (e.g., the client device 102). A shareability score for a particular content item represents the likelihood that members of the organization will share the content item. In this context, sharing means republishing the content item on one or more social networks such that the social contacts of the sharing members can view or access the shared content item. For example, a member can post a link to an article in their social media feed.

In some example embodiments, the list of content is included with the request or designated by the request. In other example embodiments, the administrator has subscribed to one or more content feeds (e.g., previously indicated content streams from which content items should be pulled) and the social networking system (e.g., the social networking system 120 in FIG. 1) gathers a list of content items from these subscribed content feeds.

In some example embodiments, the content items are automatically identified by the social networking system (e.g., the social networking system 120 in FIG. 1) based on past interactions with the administrator and the organization.

In some example embodiments, the social networking system (e.g., the social networking system 120 in FIG. 1) identifies (Operation 806) a plurality of members associated with the organization. In some example embodiments, the social networking system (e.g., the social networking system 120 in FIG. 1) includes a plurality of organizations that are included on the social networking system (e.g., the social networking system 120 in FIG. 1). Each organization has a list of members who are associated with the organization. For example, in some example embodiments, the organization is a company and the associated members are employees. In other examples, the organizations are different demographic segments with an organization and the members are employees that fit into those demographic segments.

In some example embodiments, the social networking system (e.g., the social networking system 120 in FIG. 1) analyzes (Operation 808) past share data for the plurality of members to generate an organization sharing profile, wherein the organization sharing profile includes data about past content item sharing among the plurality of members associated with the organization. For example, the social networking system (e.g., the social networking system 120 in FIG. 1) accesses a member profile for each member in the list of members associated with the organization. In some example embodiments, the member profile includes information about past instances when the member shared a content item. In other example embodiments, the member profile also includes past instances when the member views a content item (or has it presented to them) but chooses not to share the content item.

Once the social networking system (e.g., the server 120 in FIG. 1) has accessed member profiles of members associated with a particular organization, the organization sharing profile for that organization can be generated. In generating the organization sharing profile, the social networking system incorporates data about past sharing behavior that is specific to members of the organization, any specified preferences received from the organization, and information the type of business the organization is engaged in (e.g., retrieved from a third party database). Thus, the organization sharing profile includes information about factors specific to the organization such as how to weight various authors, publishers, and content and what key words are the most important that can be used to generate a more specific shareability score for articles that are considered for the organization In some example embodiments, the organization sharing profile is used to build a model for a given organization (or general group of members), such that information about the content is given as input to the model and the model outputs a shareability score. In some example embodiments, the model is created using computer learning techniques such as a neural network.

In some example embodiments, one factor the organization profile considers is the author of the content item. In some example embodiments, the social networking system (e.g., the social networking system 120 in FIG. 1) determines (810) a list of authors associated with one or more of the past content items.

For each respective author in the one or more authors, the social networking system (e.g., the social networking system 120 in FIG. 1) determines (812) the share rate by the plurality of members associated with the organization for the respective author. For example, the social networking system (e.g., the social networking system 120 in FIG. 1) determines the average number of shared content items authored by Author A. In some example embodiments, the social networking system (e.g., the social networking system 120 in FIG. 1) determines a confidence score for each share rate, based, in part, on the number of content items, the importance of the sharing members, and the time from when the content was made available until when it was shared.

In some example embodiments, the social networking system (e.g., the social networking system 120 in FIG. 1) alters (814) the organization sharing profile to include the share rate for each respective author. In some example embodiments, the social networking system (e.g., the social networking system 120 in FIG. 1) can use information about the share rate of a particular author to increase accuracy in determining shareability for content items authored by that author in the future.

In some example embodiments, analyzing the plurality of members to generate an organization profile further includes the social networking system (e.g., the social networking system 120 in FIG. 1) determining (816) a list of publishers associated with one or more past content items. For example, each content item has an associated publisher, which is an entity (e.g., a person or an organization) that causes the content item to be available.

For each respective publisher in the list of publishers, the social networking system (e.g., the social networking system 120 in FIG. 1) determines (818) the share rate by the plurality of members associated with the organization for the respective publisher. For example, the social networking system (e.g., the social networking system 120 in FIG. 1) calculates, for each publisher, an average share rate for content items from that publisher. In some example embodiments, the average share rate also includes a confidence level, which represents how confident the social networking system (e.g., the social networking system 120 in FIG. 1) is with the calculated share rate (e.g., based on the number of data points that are available and the reputation of the members who have previously shared content items).

Figure 8B:
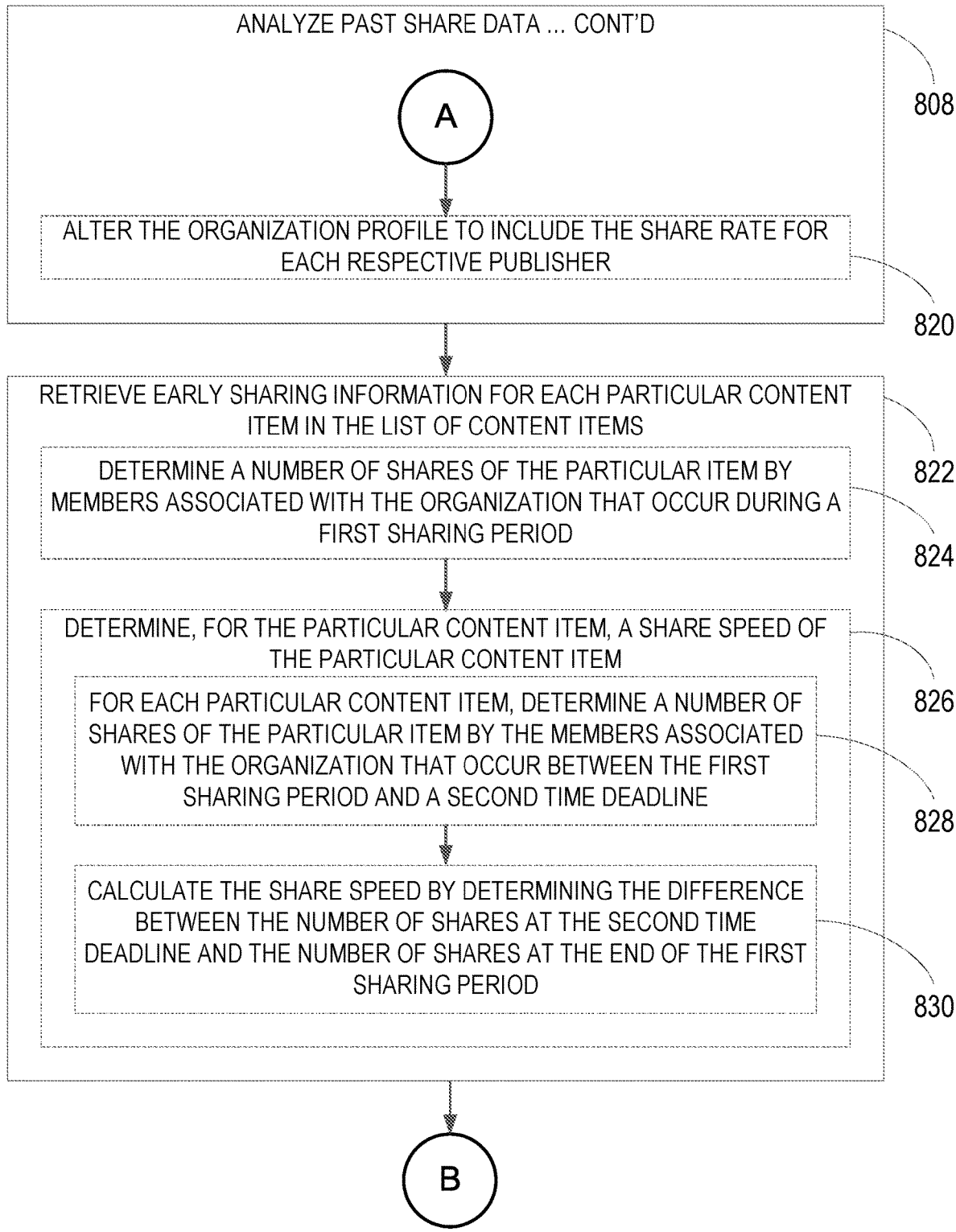

FIG. 8B is a flow diagram illustrating a method, in accordance with some example embodiments, for evaluating content items based on how likely the content items are to be shared by a particular group of members of a social networking system (e.g., the social networking system 120 in FIG. 1). Each of the operations shown in FIG. 8B may correspond to instructions stored in a computer memory or computer-readable storage medium. Optional operations are indicated by dashed lines (e.g., boxes with dashed-line borders). In some embodiments, the method described in FIG. 8B is performed by the social networking system (e.g., the social networking system 120 in FIG. 1). However, the method described can also be performed by any other suitable configuration of electronic hardware. FIG. 8B continues the method described in FIG. 8A.

In some embodiments the method is performed by a social networking system (e.g., the social networking system 120 in FIG. 1) including one or more processors and memory storing one or more programs for execution by the one or more processors.

In some example embodiments, analyzing the plurality of members to generate an organization profile further includes the social networking system (e.g., the social networking system 120 in FIG. 1) altering (820) the organization profile to include the share rate for each respective publisher. In this way, when scoring a particular content item, the social networking system (e.g., the social networking system 120 in FIG. 1) uses share rate data stored in the organization profile to more accurately predict the shareability of a particular content item.

In some example embodiments, the social networking system (e.g., the social networking system 120 in FIG. 1) retrieves (822) early sharing information for each particular content item in the list of content items. For example, the social networking system (e.g., the social networking system 120 in FIG. 1) monitors sharing activity in the social networking system (e.g., the social networking system 120 in FIG. 1) and identifies, for each content item, any sharing activity from the members associated with the organization.

In some example embodiments, for each particular content item, the social networking system (e.g., the social networking system 120 in FIG. 1) determines (824) a number of shares of the particular item by members associated with the organization that occur during a first sharing period. For example, the social networking system (e.g., the social networking system 120 in FIG. 1) determines the number of shares that have occurred in the first four hours after the content item was originally published. In some example embodiments, the social networking system (e.g., the social networking system 120 in FIG. 1) only identifies early shares by members associated with the organization. In other example embodiments, the social networking system (e.g., the social networking system 120 in FIG. 1) counts early shares by any member of the social networking system (e.g., the social networking system 120 in FIG. 1).

In some example embodiments, the social networking system (e.g., the social networking system 120 in FIG. 1) weighs early shares based on the reputation of the member who shares the content item. In this way, a smaller number of early shares from highly influential members may be determined to be more important than a larger number of low influence members. In some example embodiments, the social networking system (e.g., the system 120 in FIG. 1) weighs early shares based on the number of contacts of the early sharers. The more contacts a sharer has, the more likely the content item will be viewed by other members.

In some example embodiments, the social networking system (e.g., the social networking system 120 in FIG. 1) determines (826), for the particular content item, a share speed of the particular content item. In some example embodiments, the share speed is a measure of how quickly the content item is spreading among members of the social networking system (e.g., the social networking system 120 in FIG. 1) (or a particular sub-group of members).

In some example embodiments, determining a share speed for a list of content items further includes, for each particular content item, the social networking system (e.g., the social networking system 120 in FIG. 1) determining (828) a number of shares of the particular content item by the members associated with the organization that occur between the end of the first sharing period and a second time deadline. For example, if the first sharing period is the first four hours from content item release, the second time deadline is set at eight hours. Thus, the social networking system (e.g., the social networking system 120 in FIG. 1) measures the number of shares at four hours (e.g., the end of the first sharing period) and the number of shares at eight hours (e.g., the second time deadline).

In some example embodiments, the social networking system (e.g., the social networking system 120 in FIG. 1) calculates (830) the share speed by determining the difference between the number of shares at the second time deadline and the number of shares at the end of the first sharing period. Thus, the share speed is a measure of how quickly a content item is shared. For example, share speed for content item A would use the number of shares at time 1 ($S_{t1}$), the number of shares at time 2 ($S_{t2}$), and the difference in time between $T_1$ and $T_2$ as follows:

$$\text{share speed} = \frac{S_{t2} - S_{t1}}{T_2 - T_1}$$

Thus, any time period can be used to calculate this speed. However, for the purposes of evaluating content items for distribution to members of the social networking system (e.g., the social networking system 120 in FIG. 1), the social networking system (e.g., the social networking system 120 in FIG. 1) will generally focus on the time frame right after a content item has been made public.

Figure 8C:
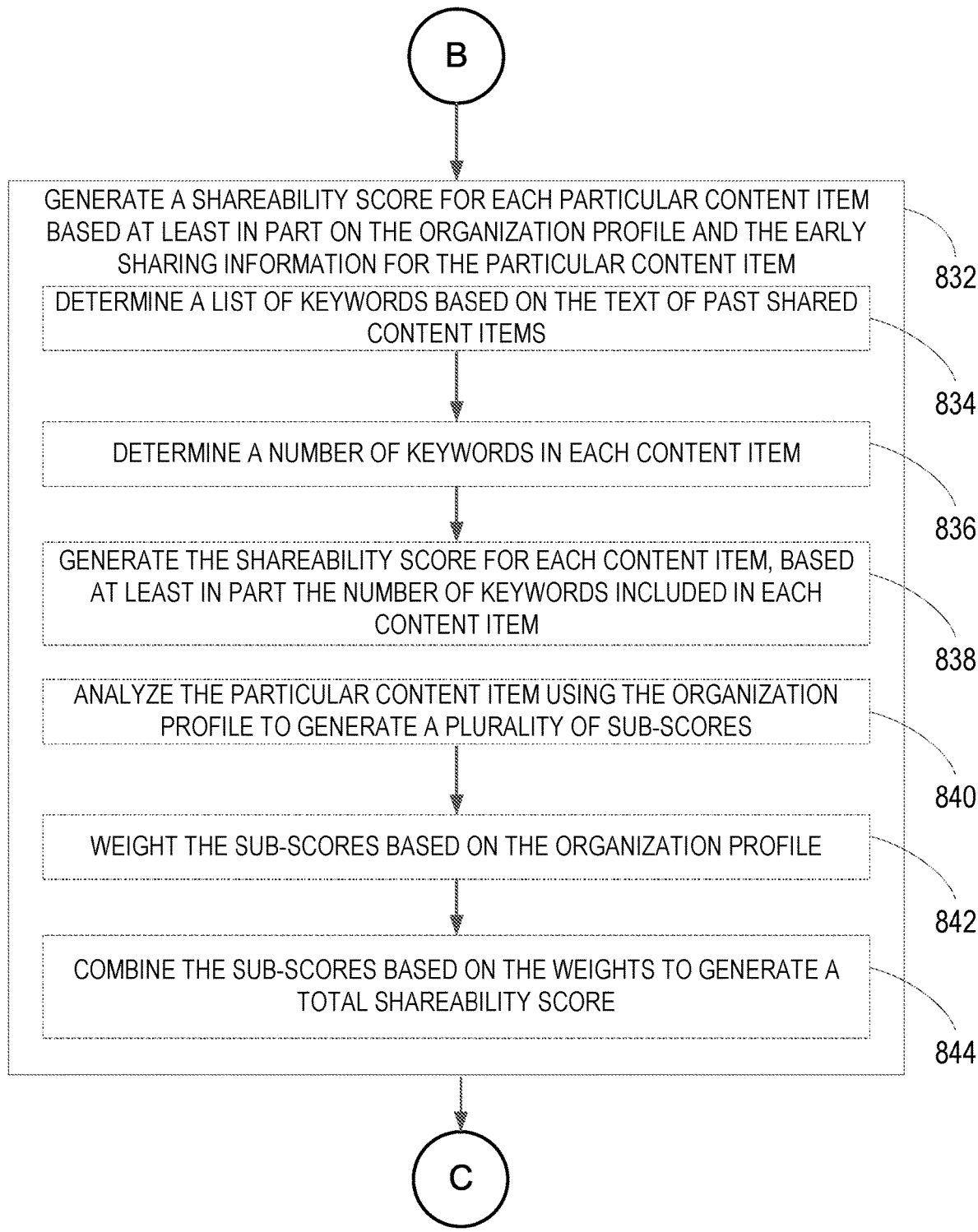

FIG. 8C is a flow diagram illustrating a method, in accordance with some example embodiments, for evaluating content items based on how likely the content items are to be shared by a particular group of members of a social networking system (e.g., the social networking system 120 in FIG. 1). Each of the operations shown in FIG. 8C may correspond to instructions stored in a computer memory or computer-readable storage medium. Optional operations are indicated by dashed lines (e.g., boxes with dashed-line borders). In some embodiments, the method described in FIG. 8C is performed by the social networking system (e.g., the social networking system 120 in FIG. 1). However, the method described can also be performed by any other suitable configuration of electronic hardware. FIG. 8C continues the method described in FIGS. 8A-8B.

In some embodiments the method is performed by a social networking system (e.g., the social networking system 120 in FIG. 1) including one or more processors and memory storing one or more programs for execution by the one or more processors.

In some example embodiments, the social networking system (e.g., the social networking system 120 in FIG. 1) generates (832) a shareability score for each particular content item based at least in part on the organization profile and the early sharing information for the particular content item. Analyzing the plurality of members to generate an organization profile further includes determining (834) a list of keywords based on the text of past shared content items. For example, the social networking system (e.g., the system 120 in FIG. 1) can calculate the inverse frequency of terms that occur in content items that are shared. In some example embodiments, each word is analyzed to determine the degree to which its presence affects the likelihood of the content item being shared. In some example embodiments, words that have a high likelihood of increasing the shareability of a content item are determined to be keywords.

In some example embodiments, the social networking system (e.g., the social networking system 120 in FIG. 1) determines (836) the number of keywords in each content item. For example, if the social networking system (e.g., the social networking system 120 in FIG. 1) identifies five keywords that are important to a first organization, the social networking system (e.g., the social networking system 120 in FIG. 1) then, for each content item, counts the number of times that those five keywords occur in the content item. Content items with more keywords receive a higher shareability score than content items with fewer keywords, all else being equal.

In some example embodiments, the social networking system (e.g., the system 120 in FIG. 1) normalizes the number of keywords based on the total length of the content item. For example, an article with 10 keywords in 1000 words maybe ranked lower than an article with 8 keywords in 200 words.

In other example embodiments, the social networking system (e.g., the social networking system 120 in FIG. 1) determines how many of the keywords occur at least once in the content item. For example, there are 55 identified keywords, and the social networking system (e.g., the social networking system 120 in FIG. 1) determines how many of those keywords appear at least once. Thus a content item that has ten keywords, each once, will have a higher shareability score than a content item that has a single keyword repeated fifty times. In some example embodiments, the social networking system (e.g., the social networking system 120 in FIG. 1) uses both a combination of the number of instances of keywords and the percentage of keywords that appear at least once.

In some example embodiments, the social networking system (e.g., the social networking system 120 in FIG. 1) generates (838) the shareability score for each content item, based at least in part the number of keywords included in each content item.

In some example embodiments, the social networking system (e.g., the social networking system 120 in FIG. 1) generates a shareability score by analyzing (840) the particular content item using the organization profile to generate a plurality of sub-scores. In some example embodiments, the sub-scores include content sub-score, historical sub-score, and an early sharing sub-score. In some example embodiments, the sub-scores are generated using an organization profile so that sub-scores for a content item might differ between two organizations.

In some example embodiments, the social networking system (e.g., the social networking system 120 in FIG. 1) weights (842) the sub-scores based on the organization profile. For example, for organization A, the content of the content item may be the most important factor or sub-score in determining shareability (based on historical sharing data), and for organization B, the early sharing activity of the content item is more important. In this case, the two organization profiles will result in different weights being given to the sub-scores.

In some example embodiments, the social networking system (e.g., the social networking system 120 in FIG. 1) combines (844) the sub-scores based on the weights to generate a total shareability score.

Figure 8D:
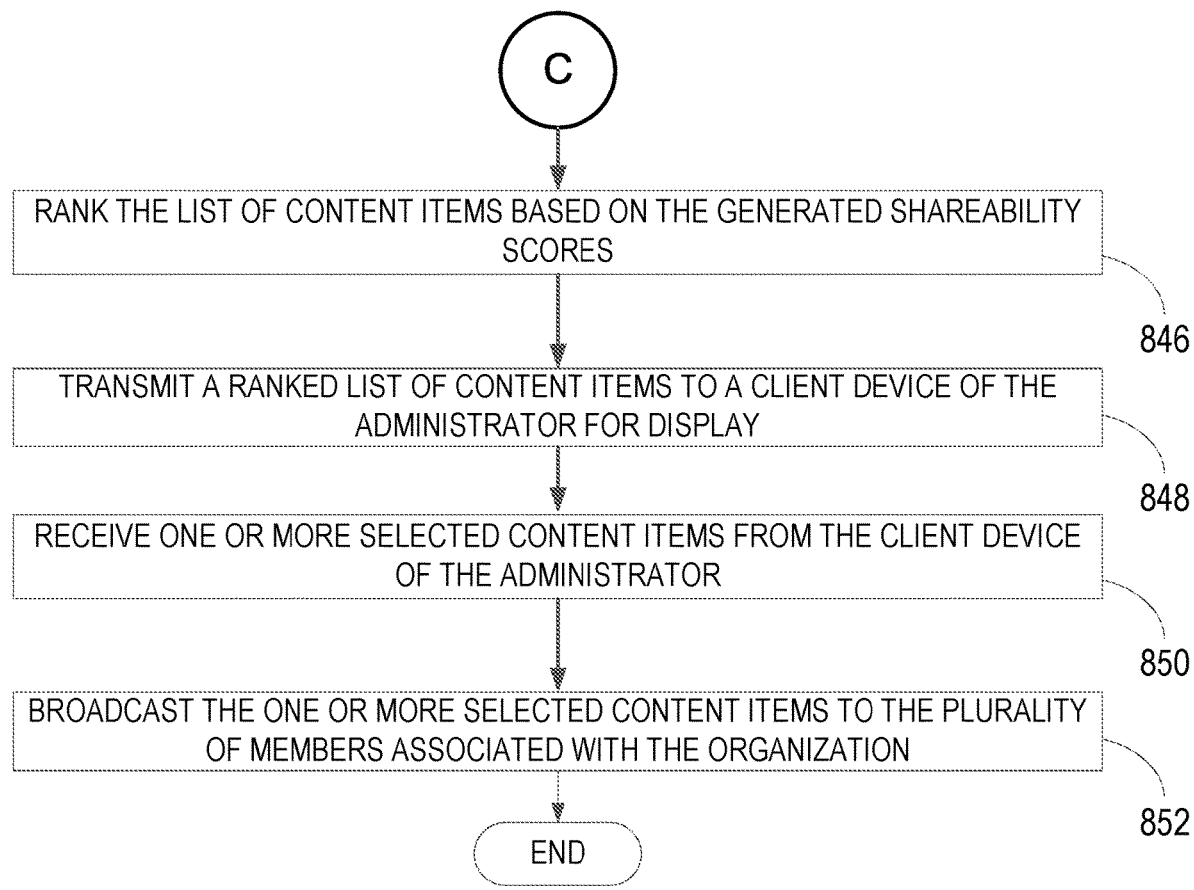

FIG. 8D is a flow diagram illustrating a method, in accordance with some example embodiments, for evaluating content items based on how likely the content items are to be shared by a particular group of members of a social networking system (e.g., the social networking system 120 in FIG. 1). Each of the operations shown in FIG. 8D may correspond to instructions stored in a computer memory or computer-readable storage medium. In some embodiments, the method described in FIG. 8D is performed by the social networking system (e.g., the social networking system 120 in FIG. 1). However, the method described can also be performed by any other suitable configuration of electronic hardware. FIG. 8C continues the method described in FIGS. 8A-8C.

In some embodiments the method is performed by a social networking system (e.g., the social networking system 120 in FIG. 1) including one or more processors and memory storing one or more programs for execution by the one or more processors.

In some example embodiments, the social networking system (e.g., the social networking system 120 in FIG. 1) ranks (846) the list of content items based on the generated shareability scores. In some example embodiments, the ranking combines the shareability scores with other measures of content item quality to provide an overall ranking.

In some example embodiments, the social networking system (e.g., the social networking system 120 in FIG. 1) transmits (848) a ranked list of content items to a client device (e.g., client device 102 of FIG. 1) of the administrator for display. In some example embodiments, the ranked list includes a shareability score that can be directly presented to the administrator. One example user interface can be seen in FIG. 5B.

In some example embodiments, the social networking system (e.g., the social networking system 120 in FIG. 1) receives (850) one or more selected content items from the client device of the administrator. For example, the administrator is presented with a ranked list of content items and selects (e.g., by clicking a checkbox or other input means) which content items are to be distributed to members associated with the organization. The social networking system (e.g., the social networking system 120 in FIG. 1) receives this selection data.

In some example embodiments, the social networking system (e.g., the social networking system 120 in FIG. 1) broadcasts (852) the one or more selected content items to the plurality of members associated with the organization. Thus, each member receives a list of selected content items. In some example embodiments, the social networking system (e.g., the social networking system 120 in FIG. 1) tracks the members to determine whether the members share each content item that is received. The newly acquired share data can be used to update the models which are used to generate the shareability scores.

In this manner, the disclosed systems and method provide a method of automatically evaluating articles to determine whether each article is likely to be shared by members associated with a specific organization. The technical benefit provided by such systems and methods is that computer systems that are designed to facilitate content sharing can now do so more accurately, quickly, and efficiently and without any time wasted waiting for user interaction. This provides an improvement over conventional techniques because such systems use less power, fewer processing cycles and less memory than existing systems.

Software Architecture

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

Figure 9:
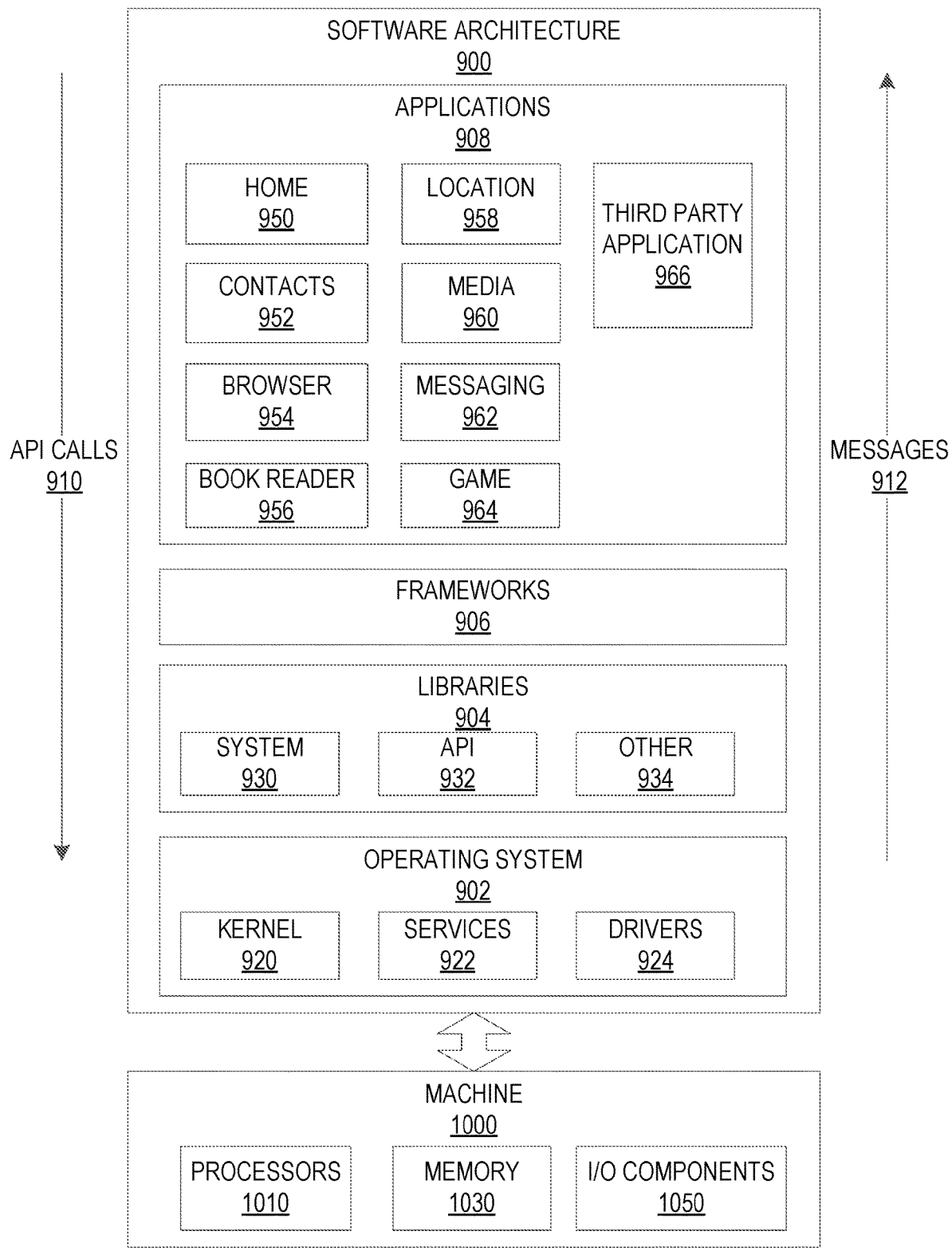
FIG. 9 is a block diagram illustrating an architecture of software, which may be installed on any of one or more devices, in accordance with some example embodiments.

FIG. 9 is a block diagram illustrating an architecture of software 900, which may be installed on any one or more of the devices of FIG. 1. FIG. 9 is merely a non-limiting example of an architecture of software 900 and it will be appreciated that many other architectures may be implemented to facilitate the functionality described herein. The software 900 may be executing on hardware such as a machine 1000 of FIG. 10 that includes processors 1010, memory 1030, and I/O components 1050. In the example architecture of FIG. 9, the software 900 may be conceptualized as a stack of layers where each layer may provide particular functionality. For example, the software 900 may include layers such as an operating system 902, libraries 904, frameworks 906, and applications 908. Operationally, the applications 908 may invoke API calls 910 through the software stack and receive messages 912 in response to the API calls 910.

The operating system 902 may manage hardware resources and provide common services. The operating system 902 may include, for example, a kernel 920, services 922, and drivers 924. The kernel 920 may act as an abstraction layer between the hardware and the other software layers. For example, the kernel 920 may be responsible for memory management, processor management (e.g., scheduling), component management, networking, security settings, and so on. The services 922 may provide other common services for the other software layers. The drivers 924 may be responsible for controlling and/or interfacing with the underlying hardware. For instance, the drivers 924 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 904 may provide a low-level common infrastructure that may be utilized by the applications 908. The libraries 904 may include system libraries 930 (e.g., C standard library) that may provide functions such as memory allocation functions, string manipulation functions, mathematic functions, and the like. In addition, the libraries 904 may include API libraries 932 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 904 may also include a wide variety of other libraries 934 to provide many other APIs to the applications 908.

The frameworks 906 may provide a high-level common infrastructure that may be utilized by the applications 908. For example, the frameworks 906 may provide various graphical user interface (GUI) functions, high-level resource management, high-level location services, and so forth. The frameworks 906 may provide a broad spectrum of other APIs that may be utilized by the applications 908, some of which may be specific to a particular operating system 902 or platform.

The applications 908 include a home application 950, a contacts application 952, a browser application 954, a book reader application 956, a location application 958, a media application 960, a messaging application 962, a game application 964, and a broad assortment of other applications, such as a third party application 966. In a specific example, the third party application 966 (e.g., an application developed using the Android™ or iOS™ software development kit (SDK) by an entity other than the vendor of the particular platform) may be mobile software running on a mobile operating system such as iOS™, Android™ Windows®

Phone, or other mobile operating systems. In this example, the third party application 966 may invoke the API calls 910 provided by the mobile operating system, such as the operating system 902, to facilitate functionality described herein.

Example Machine Architecture and
Machine-Readable Medium

Figure 10:
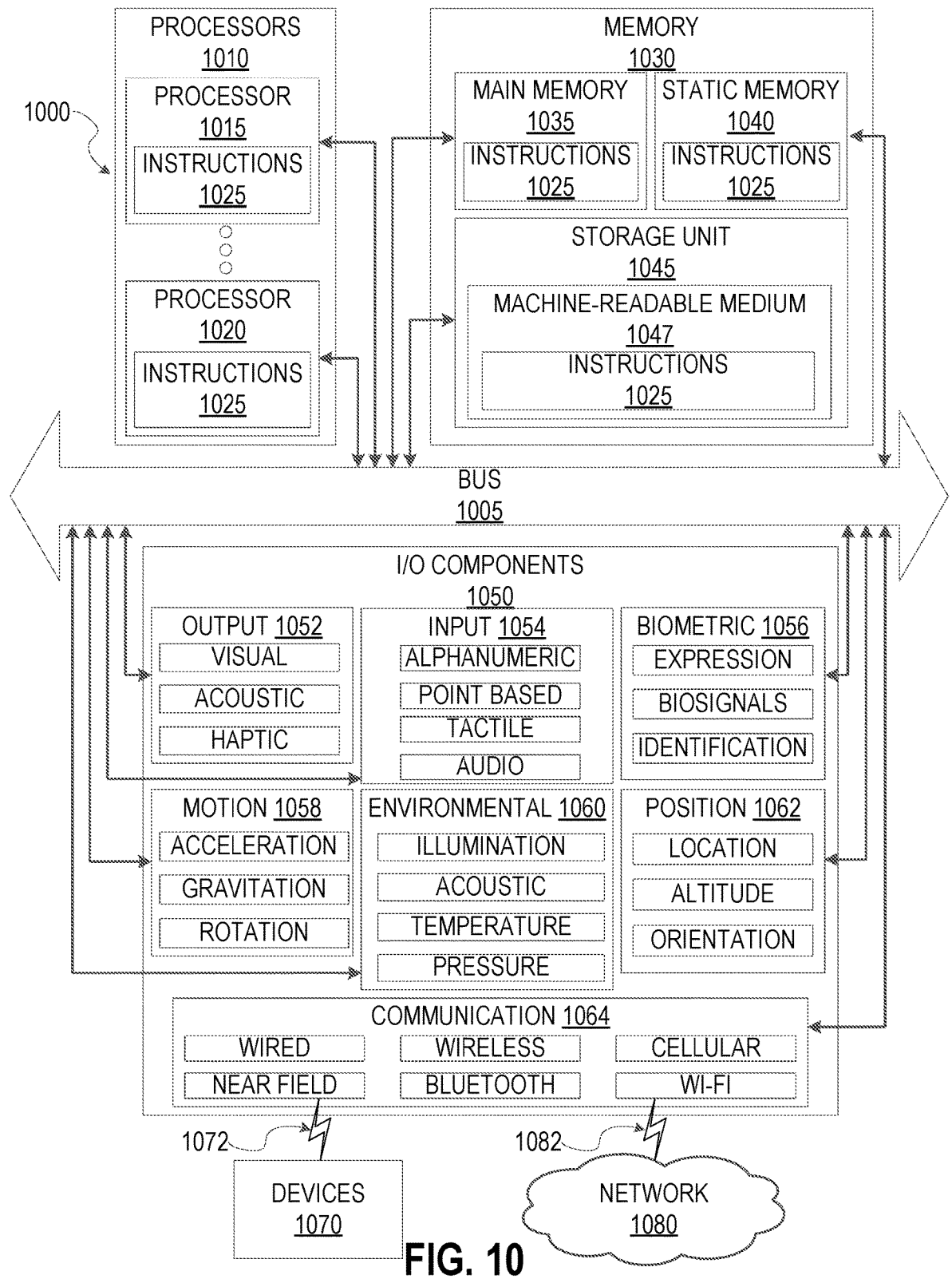
FIG. 10 is a block diagram illustrating components of a machine, according to some example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1025 (e.g., software 900, a program, an application, an applet, an app, or other executable code) for causing the machine 1000 to perform any one or more of the methodologies discussed herein may be executed. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but be not limited to, a server computer, a client computer, a PC, a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1025, sequentially or otherwise, that specify actions to be taken by the machine 1000. Further, while only a single machine 1000 is illustrated, the term "machine" shall also be taken to include a collection of machines 1000 that individually or jointly execute the instructions 1025 to perform any one or more of the methodologies discussed herein.

The machine 1000 may include processors 1010, memory 1030, and I/O components 1050, which may be configured to communicate with each other via a bus 1005. In an example embodiment, the processors 1010 (e.g., a CPU, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1015 and a processor 1020, which may execute the instructions 1025. The term "processor" is intended to include multi-core processors 1010 that may comprise two or more independent processors 1015, 1020 (also referred to as "cores") that may execute the instructions 1025 contemporaneously. Although FIG. 10 shows multiple processors 1010, the machine 1000 may include a single processor 1010 with a single core, a single processor 1010 with multiple cores (e.g., a multi-core processor), multiple processors 1010 with a single core, multiple processors 1010 with multiple cores, or any combination thereof.

The memory 1030 may include a main memory 1035, a static memory 1040, and a storage unit 1045 accessible to the processors 1010 via the bus 1005. The storage unit 1045 may include a machine-readable medium 1047 on which are stored the instructions 1025 embodying any one or more of the methodologies or functions described herein. The instructions 1025 may also reside, completely or at least partially, within the main memory 1035, within the static memory 1040, within at least one of the processors 1010 (e.g., within the processor's cache memory), or any suitable combination thereof, during execution thereof by the machine 1000. Accordingly, the main memory 1035, the static memory 1040, and the processors 1010 may be considered machine-readable media 1047.

As used herein, the term "memory" refers to a machine-readable medium 1047 able to store data temporarily or permanently and may be taken to include, but not be limited to, random-access memory (RAM), read-only memory (ROM), buffer memory, flash memory, and cache memory. While the machine-readable medium 1047 is shown, in an example embodiment, to be a single medium, the term "machine-readable medium" should be taken to include a single medium or multiple media (e.g., a centralized or distributed database, or associated caches and servers) able to store the instructions 1025. The term "machine-readable medium" shall also be taken to include any medium, or combination of multiple media, that is capable of storing instructions (e.g., instructions 1025) for execution by a machine (e.g., machine 1000), such that the instructions 1025, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 may include a wide variety of components to receive input, provide and/or produce output, transmit information, exchange information, capture measurements, and so on. It will be appreciated that the I/O components 1050 may include many other components that are not shown in FIG. 10. In various example embodiments, the I/O components 1050 may include output components 1052 and/or input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or other pointing instruments), tactile input components (e.g., a physical button, a touch screen that provides location and force of touches or touch gestures, and/or other tactile input components), audio input components (e.g., a microphone), and the like.

In further example embodiments, the I/O components 1050 may include biometric components 1056, motion components 1058, environmental components 1060, and/or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), acoustic sensor components (e.g., one or more microphones that detect background noise), temperature sensor components (e.g., one or more thermometers that detect ambient temperature), humidity sensor components, pressure sensor components (e.g., barometer), proximity sensor components (e.g., infrared sensors that detect nearby objects), and/or other components that may provide indications, measurements, and/or signals corresponding to a surrounding physical environment. The position components 1062 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 and/or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine 1000 and/or any of a wide variety of peripheral devices (e.g., a peripheral device coupled via a USB).

Moreover, the communication components 1064 may detect identifiers and/or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar codes, multi-dimensional bar codes such as a Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1080 may be an ad hoc network, an intranet, an extranet, a virtual private network (VPN), a LAN, a wireless LAN (WLAN), a WAN, a wireless WAN (WWAN), a MAN, the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1025 may be transmitted and/or received over the network 1080 using a transmission medium via a network interface device (e.g., a network interface component included in the communication components 1064) and utilizing any one of a number of well-known transfer protocols (e.g., HTTP). Similarly, the instructions 1025 may be transmitted and/or received using a transmission medium via the coupling 1072 (e.g., a peer-to-peer coupling) to the devices 1070. The term "transmission medium" shall be taken to include any intangible medium that is capable of storing, encoding, or carrying the instructions 1025 for execution by the machine 1000, and includes digital or analog communications signals or other intangible media to facilitate communication of such software 900.

Furthermore, the machine-readable medium 1047 is non-transitory (in other words, not having any transitory signals) in that it does not embody a propagating signal. However, labeling the machine-readable medium 1047 as "non-transitory" should not be construed to mean that the medium is incapable of movement; the medium should be considered as being transportable from one physical location to another. Additionally, since the machine-readable medium 1047 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A method performed at a social networking system, using at least one computer processor, the method comprising:

receiving a request from an administrator associated with an organization to generate a shareability score for a list of content items, the shareability score for a particular content item representing a likelihood that members of an organization will share the particular content item;

identifying a plurality of members associated with the organization;

based on past share data for the plurality of members, generating an organization sharing profile, the organization sharing profile including data about past content item sharing among the plurality of members associated with the organization, the organization sharing profile further including one or more factors pertaining to weighting at least one of authors, publishers, or content items;

retrieving early sharing information for each particular content item in the list of content items, the early sharing information including a number of shares of the particular content item that occur during a particular time period that starts at a time the particular content item is published;

generating a shareability score for each particular content item based on combining (a) one or more weighted sub-scores corresponding to the one or more factors included in the organization sharing profile and (b) a weighted sub-score corresponding to the early sharing information for each particular content item, the generating of the shareability score being performed using one or more hardware processors;

ranking the list of content items based on the generated shareability scores;

transmitting the ranked list of content items to a client device of the administrator for display;

receiving one or more selected content items from the client device of the administrator; and broadcasting the one or more selected content items to a plurality of client devices, each client device being associated with at least one member selected from the plurality of members associated with the organization.

2. The method of claim 1, wherein the list of content items is specified by the request to generate a shareability score.

3. The method of claim 1, wherein the list of content items is obtained based on a subscription to one or more content feeds.

4. The method of claim 3, wherein the organization is a company and the associated plurality of members are employees.

5. The method of claim 1, wherein the generating of the organization sharing profile includes:
determining a list of authors associated with one or more past content items;
for each respective author in the list of authors, determining a share rate by the plurality of members associated with the organization for the respective author; and
altering the organization sharing profile to include the share rate for each respective author.

6. The method of claim 1, wherein the generating of the organization sharing profile includes:
determining a list of publishers associated with one or more past content items;
for each respective publisher in the list of publishers, determining the share rate by the plurality of members associated with the organization for the respective publishers; and
altering the organization profile to include the share rate for each respective publisher.

7. The method of claim 1, wherein the generating of the organization sharing profile includes:
determining a list of keywords based on the text of past shared content items; and
wherein the generating of the shareability score for each particular content item includes:
determining a number of keywords in each particular content item; and
generating the shareability score for each particular content item, based on the number of keywords included in each particular content item.

8. The method of claim 1, wherein the retrieving of the early sharing information for the list of content items includes:
for each particular content item, determining a number of shares of the particular content item by the plurality of members associated with the organization that occur during a first sharing period.

9. The method of claim 8, further comprising:
determining, for the particular content item, a share speed of the particular content item, wherein determining a share speed comprises:
for each particular content item, determining a number of shares of the particular item by the plurality of members associated with the organization that occur between the first sharing period and a second time deadline; and
calculating the share speed by determining the difference between the number of shares at the second time deadline and the number of shares at the end of the first sharing period.

10. The method of claim 1, wherein the generating of the shareability score for the particular content item comprises:
based on analyzing the particular content item using the organization sharing profile, generating the one or more sub-scores corresponding to the one or more factors included in the organization sharing profile;
generating the sub-score corresponding to the early sharing information for each particular content item; and
weighting the sub-scores based on the organization sharing profile.

11. A system comprising:
one or more hardware processors; and
a computer-readable medium for storing computer-executable instructions that, when executed by one or more hardware processors, cause the one or more hardware processors to perform operations comprising:
receiving a request from an administrator associated with an organization to generate a shareability score for a list of content items, the shareability score for a particular content item representing a likelihood that members of an organization will share the particular content item;
identifying a plurality of members associated with the organization;
based on past share data for the plurality of members, generating an organization sharing profile, the organization sharing profile including data about past content item sharing among the plurality of members associated with the organization, the organization sharing profile further including one or more factors pertaining to weighting at least one of authors, publishers, or content items;
retrieving early sharing information for each particular content item in the list of content items, the early sharing information including a number of shares of the particular content item that occur during a particular time period that starts at a time the particular content item is published;
generating a shareability score for each particular content item based on combining (a) one or more weighted sub-scores corresponding to the one or more factors included in the organization sharing profile and (b) a weighted sub-score corresponding to the early sharing information for each particular content item;
ranking the list of content items based on the generated shareability scores;
transmitting the ranked list of content items to a client device of the administrator for display;
receiving one or more selected content items from the client device of the administrator; and
broadcasting the one or more selected content items to a plurality of client devices, each client device being associated with at least one member selected from the plurality of members associated with the organization.

12. The system of claim 11, wherein the list of content items is specified by the request to generate a shareability score.

13. The system of claim 11, wherein the list of content items is obtained based on content feeds the administrator is subscribed to.

14. The system of claim 13, wherein the organization is a company and the associated plurality of members are employees.

15. The system of claim 11, wherein the generating of the organization sharing profile includes:
determining a list of authors associated with one or more past content items;
for each respective author in the list of authors, determining a share rate by the plurality of members associated with the organization for the respective author; and
altering the organization sharing profile to include the share rate for each respective author.

16. A non-transitory computer-readable storage medium storing instructions that, when executed by one or more hardware processors of a machine, cause the machine to perform operations comprising:
receiving a request from an administrator associated with an organization to generate a shareability score for a list of content items, the shareability score for a particular content item representing a likelihood that members of an organization will share the particular content item;

identifying a plurality of members associated with the organization;

based on past share data for the plurality of members, generating an organization sharing profile, the organization sharing profile including data about past content item sharing among the plurality of members associated with the organization, the organization sharing profile further including one or more factors pertaining to weighting at least one of authors, publishers, or content items;

retrieving early sharing information for each particular content item in the list of content items, the early sharing information including a number of shares of the particular content item that occur during a particular time period that starts at a time the particular content item is published;

generating a shareability score for each particular content item based on combining (a) one or more weighted sub-scores corresponding to the one or more factors included in the organization sharing profile and (b) a weighted sub-score corresponding to the early sharing information for each particular content item;

ranking the list of content items based on the generated shareability scores;

transmitting the ranked list of content items to a client device of the administrator for display;

receiving one or more selected content items from the client device of the administrator; and broadcasting the one or more selected content items to a plurality of client devices, each client device being associated with at least one member selected from the plurality of members associated with the organization.

17. The non-transitory computer-readable storage medium of claim 16, wherein the list of content items is specified by the request to generate a shareability score.

18. The non-transitory computer-readable storage medium of claim 16, wherein the list of content items is obtained based on content feeds the administrator is subscribed to.

19. The non-transitory computer-readable storage medium of claim 18, wherein the organization is a company and the associated plurality of members are employees.

20. The non-transitory computer-readable storage medium of claim 16, wherein the generating of the organization sharing profile includes:

determining a list of authors associated with one or more past content items;

for each respective author in the list of authors, determining a share rate by the plurality of members associated with the organization for the respective author; and altering the organization sharing profile to include the share rate for each respective author.

* * * * *